United States Patent
Shan

(10) Patent No.: US 10,701,743 B2
(45) Date of Patent: Jun. 30, 2020

(54) USER PLANE RESOURCE ALLOCATION

(71) Applicant: INTEL IP CORPORATION, Santa Clara, CA (US)

(72) Inventor: Chang Hong Shan, Portland, OR (US)

( * ) Notice: Subject to any disclaimer, the term of this patent is extended or adjusted under 35 U.S.C. 154(b) by 0 days.

(21) Appl. No.: 15/766,331

(22) PCT Filed: Mar. 25, 2016

(86) PCT No.: PCT/US2016/024271
§ 371 (c)(1),
(2) Date: Apr. 5, 2018

(87) PCT Pub. No.: WO2017/078776
PCT Pub. Date: May 11, 2017

(65) Prior Publication Data
US 2018/0295659 A1  Oct. 11, 2018

(30) Foreign Application Priority Data
Nov. 6, 2015  (WO) ................ PCT/CN2015/094002

(51) Int. Cl.
| | | |
|---|---|---|
| *H04W 4/00* | (2018.01) | |
| *H04W 76/11* | (2018.01) | |
| *H04W 76/12* | (2018.01) | |
| *H04L 12/14* | (2006.01) | |

(Continued)

(52) U.S. Cl.
CPC ......... *H04W 76/11* (2018.02); *H04L 12/1407* (2013.01); *H04M 15/66* (2013.01); *H04W 76/12* (2018.02); *H04W 88/16* (2013.01)

(58) Field of Classification Search
None
See application file for complete search history.

(56) References Cited

U.S. PATENT DOCUMENTS

| | | |
|---|---|---|
| 2011/0235605 A1 | 9/2011 | Yeoum et al. |
| 2011/0292896 A1 | 12/2011 | Yeuom et al. |

(Continued)

FOREIGN PATENT DOCUMENTS

| | | |
|---|---|---|
| EP | 2854475 A1 | 4/2015 |
| WO | 2014098405 A1 | 6/2014 |
| WO | 2928121 A1 | 10/2015 |

OTHER PUBLICATIONS

3GPP TS 23.401, "3rd Generation Partnership Project; Technical Specification Group Services and System Aspects; General Packet Radio Service (GPRS) Enhancements for Evolved Universal Terrestrial Radio Access Network (E-UTRAN) access", (Release 13), V 13.4.0, Sep. 22, 2015, 334 pages.

(Continued)

*Primary Examiner* — Phirin Sam
(74) *Attorney, Agent, or Firm* — Stoel Rives LLP

(57) ABSTRACT

Apparatus and methods for allocating resources (e.g., an IP address, a TEID) for a user plane node in a network providing wireless communications. A serving gateway (SGW) control plane (SGW-C) node of a core network can allocate a resource for a SGW user plane (SGW-U) node. The SGW-U can allocate a resource and communicate to the SGW-C. A packet data network gateway (PGW) control plane (PGW-C) node can allocate a resource for a PGW user plane (PGW-U). The PGW-U can al locate a resource and communicate to the PGW-C.

19 Claims, 12 Drawing Sheets

(51) Int. Cl.
*H04M 15/00* (2006.01)
*H04W 88/16* (2009.01)

(56) References Cited

U.S. PATENT DOCUMENTS

| | | | | |
|---|---|---|---|---|
| 2014/0169330 | A1* | 6/2014 | Rommer | H04W 36/08 |
| | | | | 370/331 |
| 2015/0063346 | A1* | 3/2015 | Eswara | H04L 65/1043 |
| | | | | 370/352 |
| 2015/0071053 | A1* | 3/2015 | Kempf | H04W 24/02 |
| | | | | 370/216 |
| 2015/0103665 | A1* | 4/2015 | Kaippallimalil | H04W 36/0011 |
| | | | | 370/235 |
| 2015/0117408 | A1* | 4/2015 | Kedalagudde | H04W 36/0027 |
| | | | | 370/331 |
| 2015/0333991 | A1* | 11/2015 | Liu | H04L 43/0835 |
| | | | | 455/406 |
| 2016/0006606 | A1* | 1/2016 | Zhu | H04L 4/0803 |
| | | | | 370/338 |
| 2016/0112896 | A1* | 4/2016 | Karampatsis | H04W 28/0252 |
| | | | | 370/230.1 |
| 2016/0337454 | A1* | 11/2016 | Hoffmann | H04L 47/72 |
| 2017/0048876 | A1* | 2/2017 | Mahindra | H04L 12/66 |
| 2017/0126618 | A1* | 5/2017 | Bhaskaran | H04L 61/2007 |

OTHER PUBLICATIONS

PCT/US2016/024271, International Search Report and Written Opinion, dated May 25, 2016, 14 pages.

\* cited by examiner

USER PLANE RESOURCE ALLOCATION

RELATED APPLICATIONS

This application is a national stage filing under 35 U.S.C § 371 of International Patent Application No. PCT/US2016/024271, filed Mar. 25, 2016, which claims priority to an international filing based on PCT/CN2015/094002, titled SERVING GATEWAY/PACKET GATEWAY USER PLANE INTERNET PROTOCOL ADDRESS AND TUNNEL ENDPOINT IDENTIFIER ALLOCATION, filed Nov. 6, 2015, each of which is hereby incorporated herein by reference in its entirety.

TECHNICAL FIELD

The present disclosure generally relates to wireless communication systems and methods.

DETAILED DESCRIPTION OF PREFERRED EMBODIMENTS

Wireless mobile communication technology uses various standards and protocols to transmit data between a base station and a wireless communication device. Wireless wide area network (WWAN) communication system standards and protocols can include, for example, the 3rd Generation Partnership Project (3GPP) long term evolution (LTE). In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNBs and may communicate with a plurality of UEs. An evolved packet core (EPC) may communicatively couple the E-UTRAN to an external network, such as the Internet. In particular, LTE networks aim to provide seamless Internet Protocol (IP) connectivity between UEs and the packet data network (PDN), without any disruption to the end users' applications during mobility.

While the term LTE may encompass the evolution of the Universal Mobile Telecommunications System (UMTS) radio access through the E-UTRAN, there is a relevant accompanying evolution of the non-radio aspects under the term "System Architecture Evolution" (SAE), which includes the EPC network. Together LTE and SAE comprise the Evolved Packet System (EPS).

The EPS provides UEs with IP connectivity to the PDN for accessing the Internet, as well as for running services such as Voice over IP (VoIP). The EPS also provides security and privacy for users and protection for the network against fraudulent use. Several EPS network elements, each with different roles, implement IP connectivity, security, and privacy functionality.

Figure 1:
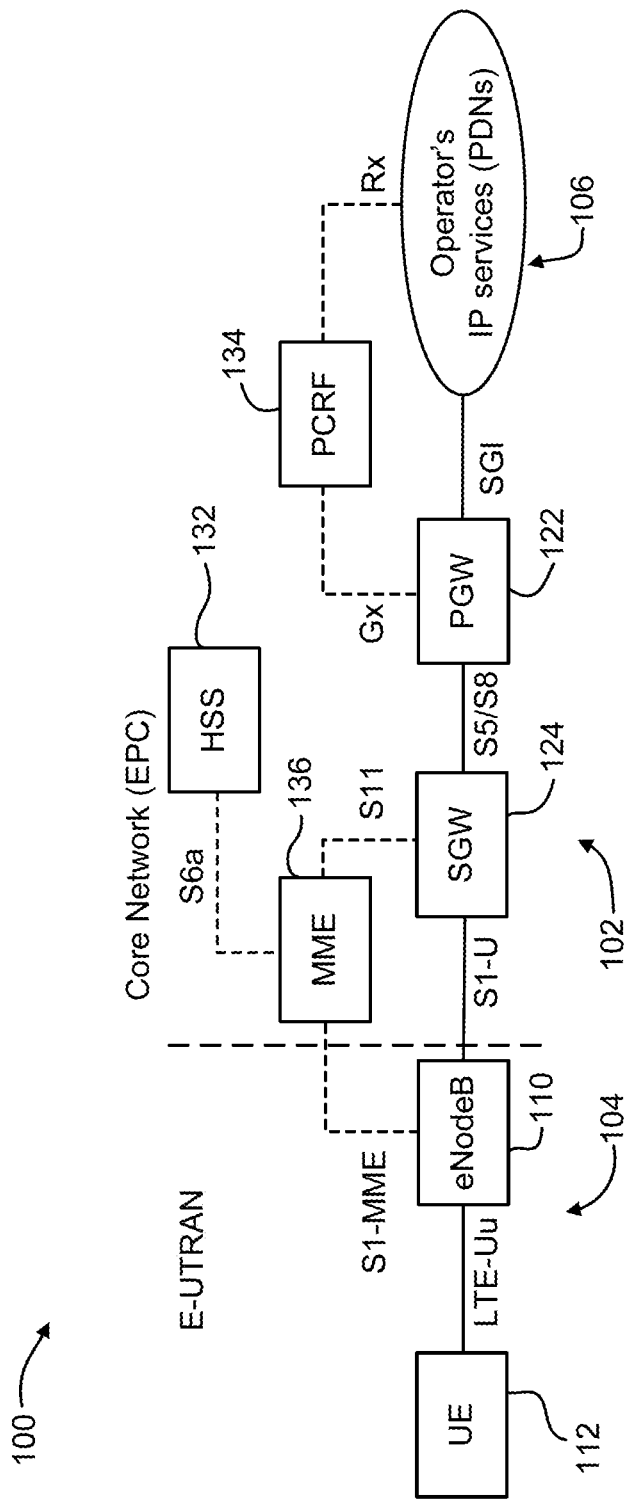
FIG. 1 is a block diagram of an example architecture of a legacy network 100 (EPS), illustrating network elements and standardized interfaces.

FIG. 1 is a block diagram of an architecture of a legacy network 100 (EPS), illustrating network elements and standardized interfaces. At a high level, the network 100 is comprised of the CN, or EPC 102, and the access network, or E-UTRAN 104. While the EPC 102 includes many types of nodes, the E-UTRAN 104 includes, in essence, just one type of node, namely the evolved NodeBs (eNodeBs) 110. The eNodeBs 110 connect to the UEs 112 utilizing a radio access technology (RAT). The various network elements are interconnected by means of interfaces that are standardized in order to allow multi-vendor interoperability, which gives network operators the possibility to source different network elements from different vendors. In fact, network operators may choose in their physical implementations to split or merge these logical network elements depending on commercial considerations.

The EPC 102 is responsible for the overall control of the UE 112 and establishment of bearers. A bearer is typically associated with a Quality of Service (QoS). Multiple bearers can be established for a user in order to provide different QoS streams or connectivity to different PDNs 106. For example, a user might be engaged in a voice (VoIP) call while at the same time performing web browsing or FTP download. A VoIP bearer would provide the necessary QoS for the voice call, while a best-effort bearer would be suitable for the web browsing or FTP session.

The main nodes of the EPC 102 may include a PDN gateway (PGW) 122, a Serving Gateway (SGW) 124, and a Mobility Management Entity (MME) 136. The EPC may also include other nodes and functions such as a Home Subscriber Server (HSS) 132 and a Policy Control and Charging Rules Function (PCRF) 134.

The PCRF 134 is responsible for policy control decision-making, as well as for controlling the flow-based charging functionalities in the Policy Control Enforcement Function (PCEF), which may reside in the PGW 122. The PCRF 134 provides the QoS authorization (QoS class identifier [QCI] and bit rates) that decides how a certain data flow will be treated in the PCEF and ensures that this is in accordance with the user's subscription profile.

The HSS 132 contains users' SAE subscription data such as the EPS-subscribed QoS profile and any access restrictions for roaming. It also holds information about the PDNs 106 to which a UE 112 can connect. This could be in the form of an access point name (APN) (which is a label according to DNS naming conventions describing the access point to the PDN 106) or a PDN address (indicating subscribed IP address(es)). In addition the HSS 132 holds dynamic information such as the identity of the MME 136 to which the user is currently attached or registered. The HSS 132 may also integrate the authentication center (AUC), which generates the vectors for authentication and security keys.

The PGW 122 is responsible for IP address allocation for the UE 112, as well as QoS enforcement and flow-based charging according to rules from the PCRF 134. The PGW 122 is responsible for the filtering of downlink user IP packets into the different QoS-based bearers. This is performed based on Traffic Flow Templates (TFTs). The PGW 122 performs QoS enforcement for guaranteed bit rate (GBR) bearers. The PGW 122 also serves as the mobility anchor for interworking with non-3GPP technologies, such as CDMA2000 and WiMAX® networks. The PGW 122 may also support a Proxy Mobile Internet Protocol (PMIP)-based interface.

The SGW 124 is responsible for serving IP packets to the E-UTRAN 104. All user IP packets are transferred through the the SGW 124, which serves as the local mobility anchor for the data bearers when a UE 112 moves between eNodeBs 110. The SGW 124 also retains the information about the bearers when a UE 112 is in the idle state (known as "EPS Connection Management-IDLE" [ECM-IDLE]) and temporarily buffers downlink data while the MME 136 initiates paging of a UE 112 to reestablish the bearers. In addition, the SGW 124 performs some administrative functions such as collecting information for charging (for example, the volume of data sent to or received from the user) and lawful interception. The SGW 124 also serves as the mobility anchor for interworking with other 3GPP technologies such as general packet radio service (GPRS), UMTS, and Global System for Mobile Communications (GSM).

The MME 136 is the control node that processes the signaling between a UE 112 and the EPC 102. The protocols running between the UE 112 and the EPC 102 are known as the Non Access Stratum (NAS) protocols. The MME 136 supports functions related to bearer management, including the establishment, maintenance and release of bearers. These functions related to bearer management are handled by a session management layer in the NAS protocol. The MME 136 also supports functions related to connection management, including the establishment of a connection and security between the network 100 and a UE 112. These functions related to connection management are handled by a connection or mobility management layer in the NAS protocol layer.

The MME 136 creates a UE context when a UE 112 is turned on and attaches to the network. The MME 136 assigns a unique short temporary identity termed the SAE Temporary Mobile Subscriber Identity (S-TMSI) to the UE 112 that identifies the UE context in the MME 136. This UE context holds user subscription information downloaded from the HSS 132. The local storage of subscription data in the MME 136 allows faster execution of procedures such as bearer establishment since it removes a need to consult the HSS 132 every time. In addition, the UE context also holds dynamic information such as the list of bearers that are established and the terminal capabilities.

To reduce the overhead in the E-UTRAN 104 and processing in the UE 112, all UE-related information in the E-UTRAN 104, including the radio bearers, can be released during long periods of data inactivity. This release results in the ECM-IDLE state. The MME 136 retains the UE context and the information about the established bearers during these idle periods.

To allow the network 100 to contact a UE 112 in the ECM-IDLE state, the UE 112 updates the network 100 as to its new location whenever it moves out of its current tracking area (TA); this procedure is called a tracking area update. The MME 136 is responsible for keeping track of the user location while the UE 112 is in the ECM-IDLE state.

When there is a need to deliver downlink data to UE 112 in the ECM-IDLE state, the MME 136 sends a paging message to all the eNodeBs 110 in its current TA, and the eNodeBs 110 page the UE 112 over the radio interface. On receipt of a paging message, the UE 112 performs a Service Request procedure, which results in moving the UE 112 to the ECM-CONNECTED state. UE-related information is thereby created in the E-UTRAN 104, and the radio bearers are reestablished. The MME 136 is responsible for the reestablishment of the radio bearers and updating the UE context in the eNodeB 110. This transition between the UE states is an idle-to-active transition. To speed up the idle-to-active transition and bearer establishment, the network 100 may support concatenation of NAS and Access Stratum (AS) procedures for bearer activation. Some interrelationship between the NAS and AS protocols is intentionally used to allow procedures to run simultaneously rather than sequentially, as in UMTS. For example, the bearer establishment procedure can be executed by the network 100 without waiting for the completion of the security procedure.

Security functions are the responsibility of the MME 136 for both signaling and user data. When a UE 112 attaches to the network 100, a mutual authentication of the UE 112 and the network 100 is performed between the UE 112 and the MME 136 and/or the HSS 132. This authentication function also establishes the security keys that are used for encryption of the bearers.

In legacy serving gateway (SGW) and packet gateway (PGW) implementation, the control plane and user plane are tightly coupled together. Accordingly, there is no need to allocate an internet protocol (IP) address and a tunnel endpoint identifier (TEID) for both control plane and user plane separately.

Figure 2:
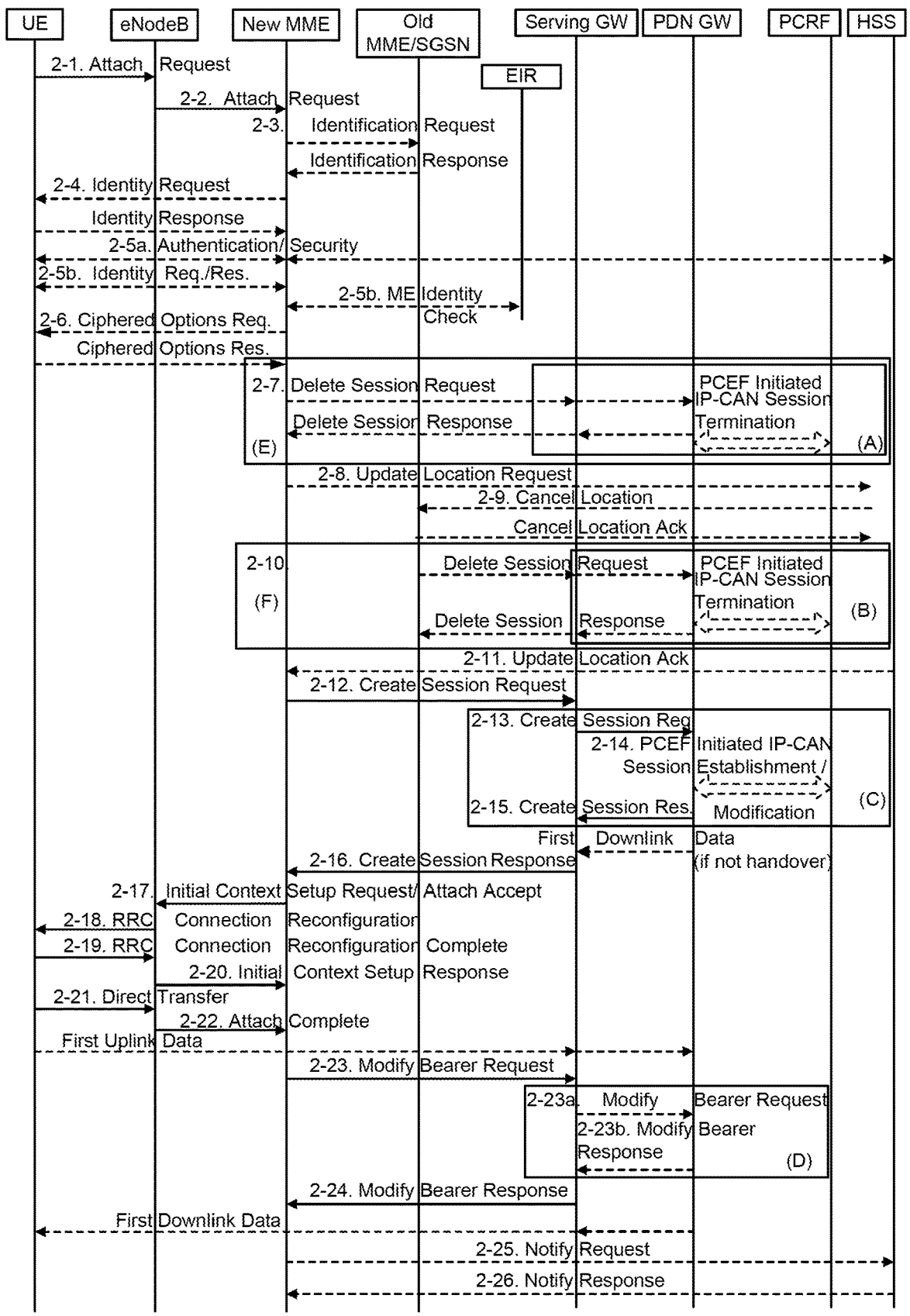
FIG. 2 is a diagram of an attach procedure of a network having a legacy architecture, such as the network of FIG. 1.

FIG. 2 is a diagram of an Attach procedure of a network having a legacy architecture, such as the network 100 of FIG. 1. The Attach procedure is according to section 5.3.2.1 of the 3GPP Technical Specification No. 23.401 (hereinafter, the "23.401"). (3GPP Organizational Partners, "3rd Generation Partnership Project; Technical Specification Group Services and System Aspects; General Packet Radio Service (GPRS) Enhancements for Evolved Universal Terrestrial Radio Access Network (E-UTRAN) access (Release 13))," 3GPP TS 23.401 V 13.4.0 technical specification, 2015.)

A UE/user can register with the network to receive services that may require registration. This registration is described as Network Attachment. The always-on IP connectivity for UE/users of the EPS is enabled by establishing a default EPS bearer during Network Attachment. The PCC rules applied to the default EPS bearer may be predefined in the PGW and activated in the attachment by the PGW itself. The Attach procedure may trigger one or multiple Dedicated Bearer Establishment procedures to establish dedicated EPS bearer(s) for that UE. During the attach procedure, the UE may request an IP address allocation.

The Attach procedure shown in FIG. 2 is now described.

Operation 2-1: Attach Request. The UE initiates the Attach procedure by the transmission, to the eNodeB, of an Attach Request (IMSI or old GUTI, old GUTI type, last visited TAI (if available), UE Core Network Capability, UE Specific DRX parameters, extended idle mode DRX parameters, Attach Type, ESM message container (Request Type, PDN Type, Protocol Configuration Options, Ciphered Options Transfer Flag), KSIASME, NAS sequence number, NAS-MAC, additional GUTI, P-TMSI signature, Voice domain preference and UE's usage setting, MS Network Capability) message together with RRC parameters indicating the Selected Network and the old GUMMEI. If the UE identifies itself with the old GUTI, the UE shall set the old GUTI Type to indicate whether the Old GUTI is a native GUTI or is mapped from a P-TMSI and RAI. The old GUTI may be derived from a P-TMSI and RAI. IMSI shall be included if the UE does not have a valid GUTI or a valid P-TMSI available, or if the UE is configured to perform Attach with IMSI at PLMN change and is accessing a new PLMN. The UE stores the TIN in detached state. If the UE's TIN indicates "GUTI" or "RAT-related TMSI" and the UE holds a valid GUTI then the old GUTI indicates this valid GUTI. If the UE's TIN indicates "P-TMSI" and the UE holds a valid P-TMSI and related RAI then these two elements are indicated as the old GUTI. Mapping a P-TMSI and RAI to a GUTI is specified in TS 23.003 [9]. If the UE holds a valid GUTI and the old GUTI indicates a GUTI mapped from a P-TMSI and RAI, then the UE indicates the GUTI as additional GUTI. If the old GUTI indicates a GUTI mapped from a P-TMSI and RAI and the UE has a valid P-TMSI signature associated to it, the P-TMSI signature shall be included. The UE sets the voice domain preference and UE's usage setting according to its configuration. The UE includes the extended idle mode DRX parameters information element if the UE desires to enable extended idle mode DRX.

If available, the last visited TAI shall be included in order to help the MME produce a good list of TAIs for any subsequent Attach Accept message. Selected Network indicates the PLMN that is selected for network sharing purposes. The RRC parameter "old GUMMEI" takes its value from the "old GUTI" contained in the Attach Request.

If the UE has valid security parameters, the Attach Request message shall be integrity protected by the NAS-MAC in order to allow validation of the UE by the MME. KSIASME, NAS sequence number and NAS-MAC are included if the UE has valid EPS security parameters. The NAS sequence number indicates the sequential number of the NAS message. If the UE does not have a valid EPS security association, then the Attach Request message is not integrity protected. In this case the security association is established in Operation 2-5a. The UE network capabilities indicate also the supported NAS and AS security algorithms. PDN type indicates the requested IP version (IPv4, IPv4/IPv6, IPv6). Protocol Configuration Options (PCOs) are used to transfer parameters between the UE and the PGW, and are sent transparently through the MME and the SGW. The PCOs may include the Address Allocation Preference indicating that the UE prefers to obtain an IPv4 address only after the default bearer activation by means of DHCPv4. If the UE intends to send PCO, which may require ciphering (e.g., PAP/CHAP usernames and passwords), or send an APN, or both, the UE shall set the Ciphered Options Transfer Flag and send PCO or APN or both only after authentication and NAS security setup have been completed (see below). If the UE has UTRAN or GERAN capabilities, it shall send the NRSU in the PCO to indicate the support of the network requested bearer control in UTRAN/GERAN. The UE sends the ETFTU in the PCO to indicate the support of the extended TFT filter format. Request Type is included in the ESM message container and indicates "Handover" when the UE has already an activated PGW/HA due to mobility with non-3GPP accesses. Attach Type indicates whether it is an EPS attach or a combined EPS/IMSI attach or an Emergency Attach.

Operation 2-2: Attach Request. The eNodeB derives the MME from the RRC parameters carrying the old GUMMEI and the indicated Selected Network. If that MME is not associated with the eNodeB or the old GUMMEI is not available, the eNodeB selects an MME. The eNodeB forwards the Attach Request message to the new MME contained in an S1-MME control message (Initial UE message) together with the Selected Network, CSG access mode, CSG ID, L-GW address, and TAI+ECGI of the cell from where it received the message to the new MME. CSG ID is provided if the UE attaches via a CSG cell or hybrid cell. CSG access mode is provided if the UE attaches via a hybrid cell. If the CSG access mode is not provided but the CSG ID is provided, the MME shall consider the cell as a CSG cell. If the eNodeB has a collocated L-GW, it includes the L-GW address in the Initial UE message to the MME.

If the MME is not configured to support Emergency Attach the MME shall reject any Attach Request that indicates Attach Type "Emergency."

Operation 2-3: Identification Request/Response. If the UE identifies itself with GUTI and the MME has changed since detach, the new MME determines the type of the old node (MME or SGSN), uses the GUTI received from the UE to derive the old MME/SGSN address, and sends an Identification Request (old GUTI, complete Attach Request message) to the old MME/SGSN to request the IMSI. If the request is sent to an old MME, the old MME first verifies the Attach Request message by NAS MAC and then responds with Identification Response (IMSI, MM Context). If the request is sent to an old SGSN, the old SGSN first verifies the Attach Request message by the P-TMSI signature and then responds with Identification Response (MM Context). If the UE is not known in the old MME/SGSN or if the integrity check or the P-TMSI signature check for the Attach Request message fails, the old MME/SGSN responds with an appropriate error cause. The MM context contains security related information as well as other parameters (including IMSI).

The additional GUTI in the Attach Request message allows the new MME to find any already existing UE context stored in the new MME when the old GUTI indicates a GUTI mapped from a P-TMSI and RAI.

Operation 2-4: Identity Request/Response. If the UE is unknown in both the old MME/SGSN and new MME, the new MME sends an Identity Request to the UE to request the IMSI. The UE responds with Identity Response (IMSI).

Operation 2-5a: Authentication/Security. If no UE context for the UE exists anywhere in the network, if the Attach Request (sent in Operation 2-1) was not integrity protected, or if the check of the integrity failed, then authentication and NAS security setup to activate integrity protection and NAS ciphering are mandatory. Otherwise it is optional. If the NAS security algorithm is to be changed, the NAS security setup is performed in this operation.

If the MME is configured to support Emergency Attach for unauthenticated IMSIs and the UE indicated Attach Type "Emergency," the MME skips the authentication and security setup or the MME accepts that the authentication may fail and continues the attach procedure.

After Operation 2-5a, all NAS messages shall be protected by the NAS security functions (integrity and ciphering) indicated by the MME unless the UE is emergency attached and not successfully authenticated.

Operation 2-5b: Identity Request/Response. The ME Identity (IMEISV) shall be retrieved from the UE. The ME identity shall be transferred encrypted unless the UE performs Emergency Attach and cannot be authenticated.

In order to minimize signaling delays, the retrieval of the ME Identity may be combined with NAS security setup in Operation 2-5a. The MME may send the ME Identity Check Request (ME Identity, IMSI) to the EIR. The EIR shall respond with ME Identity Check Ack (Result). Dependent upon the Result, the MME decides whether to continue with this Attach procedure or to reject the UE.

Operation 2-6: Ciphered Options Request/Response. If the UE has set the Ciphered Options Transfer Flag in the Attach Request message, the Ciphered Options i.e., PCO or APN or both, shall now be retrieved from the UE.

In order to handle situations where the UE may have subscriptions to multiple PDNs, if the Protocol Configuration Options contains user credentials (e.g., user name/password within PAP or CHAP parameters) then the UE should also send the APN to the MME.

Operation 2-7: Delete Session Request/Response (IP-CAN Session Termination). If there are active bearer contexts in the new MME for this particular UE (i.e., the UE re-attaches to the same MME without having properly detached before), the new MME deletes these bearer contexts by sending Delete Session Request (LBI) messages to the GWs involved. The GWs acknowledge with a Delete Session Response (Cause) message. If a PCRF is deployed, the PGW employs an IP-CAN Session Termination procedure to indicate that resources have been released.

Operation 2-8: Update Location Request. If the MME has changed since the last detach, or if there is no valid subscription context for the UE in the MME, or if the UE provides an IMSI or the UE provides an old GUTI which does not refer to a valid context in the MME, or for some network sharing scenario (e.g., GWCN) if the PLMN-ID of the TAI supplied by the eNodeB is different from that of the GUTI in the UE's context, the MME sends an Update Location Request (MME Identity, IMSI, ME Identity (IMEISV), MME Capabilities, ULR-Flags, Homogeneous Support of IMS Voice over PS Sessions, UE SRVCC capability, equivalent PLMN list) message to the HSS. The MME capabilities indicate the MME's support for regional access restrictions functionality. ULR-Flags indicates "Initial-Attach-Indicator" as this is an Attach procedure. The inclusion of the equivalent PLMN list indicates that the MME supports the inter-PLMN handover to a CSG cell in an equivalent PLMN using the subscription information of the target PLMN. The "Homogenous Support of IMS Voice over PS Sessions" indication shall not be included unless the MME has completed its evaluation of the support of "IMS Voice over PS Session" as specified.

If the UE performs Initial or Handover Attach in a VPLMN supporting Autonomous CSG Roaming and the HPLMN has enabled Autonomous CSG Roaming in the VPLMN (via Service Level Agreement) and the MME can retrieve the CSG subscription information of the UE from the CSS, the MME initiates the Update CSG Location Procedure with CSS.

If the MME determines that only the UE SRVCC capability has changed, the MME sends a Notify Request to the HSS to inform about the changed UE SRVCC capability.

Operation 2-9: Cancel Location/Ack. The HSS sends Cancel Location (IMSI, Cancellation Type) to the old MME. The old MME acknowledges with Cancel Location Ack (IMSI) and removes the MM and bearer contexts. If the ULR-Flags indicates "Initial-Attach-Indicator" and the HSS has the SGSN registration, then the HSS sends Cancel Location (IMSI, Cancellation Type) to the old SGSN. The Cancellation Type indicates the old MME/SGSN to release the old SGW resource.

Operation 2-10: Delete Session Request/Response (IP-CAN Session Termination). If there are active bearer contexts in the old MME/SGSN for this particular UE, the old MME/SGSN deletes these bearer contexts by sending Delete Session Request (LBI) messages to the GWs involved. The GWs return a Delete Session Response (Cause) message to the old MME/SGSN. If a PCRF is deployed, the PGW employs an IP-CAN Session Termination procedure to indicate that resources have been released.

Operation 2-11: Update Location Ack. The HSS acknowledges the Update Location message by sending an Update Location Ack (IMSI, Subscription data) message to the new MME. The Subscription Data contain one or more PDN subscription contexts. Each PDN subscription context contains an "EPS subscribed QoS profile" and the subscribed APN-AMBR and the WLAN offloadability indication. The new MME validates the UE's presence in the (new) TA. If due to regional subscription restrictions or access restrictions (e.g., CSG restrictions) the UE is not allowed to attach in the TA or due to subscription checking fails for other reasons, the new MME rejects the Attach Request with an appropriate cause. If all checks are successful then the new MME constructs a context for the UE. If the APN provided by the UE is not allowed by subscription, or the Update Location is rejected by the HSS, the new MME rejects the Attach Request from the UE with an appropriate cause.

The Subscription Data may contain CSG subscription information for the registered PLMN and for the equivalent PLMN list requested by MME in Operation 2-8.

If the UE provided APN is authorized for LIPA according to the user subscription, the MME shall use the CSG Subscription Data to authorize the connection.

Operation 2-12: Create Session Request. If the UE performs Initial or Handover Attach via a CSG cell and there is no subscription for that CSG or the CSG subscription is expired, the MME shall reject the Attach Request with an appropriate cause. If the UE has this CSG ID and associated PLMN on its Allowed CSG list, the UE shall remove the CSG ID and associated PLMN from the list when receiving this reject cause.

If a subscribed PDN address is allocated for the UE for this APN, the PDN subscription context contains the UE's IPv4 address and/or the IPv6 prefix and optionally the PGW identity. If the PDN subscription context contains a subscribed IPv4 address and/or IPv6 prefix, the MME indicates it in the PDN address. For Request Type indicating "Initial request," if the UE does not provide an APN, the MME shall use the PGW corresponding to the default APN for default bearer activation. If the UE provides an APN, this APN shall be employed for default bearer activation. For Request Type indicating "Handover," if the UE provides an APN, the MME shall use the PGW corresponding to the provided APN for default bearer activation. If the UE does not provide an APN, and the subscription context from HSS contains a PGW identity corresponding to the default APN, the MME shall use the PGW corresponding to the default APN for default bearer activation. The case where the Request Type indicates "Handover" and the UE does not provide an APN, and the subscription context from HSS does not contain a PGW identity corresponding to the default APN, this constitutes an error case. If the Request Type indicates "Initial request" and the selected PDN subscription context contains no PGW identity, the new MME selects a PGW. If the PDN subscription context contains a dynamically allocated PGW identity and the Request Type does not indicate "Handover," the MME may select a new PGW, e.g., to allocate a PGW that allows for more efficient routing.

For initial and handover Emergency Attach the MME uses the PGW Selection function.

The new MME selects a SGW and allocates an EPS Bearer Identity for the Default Bearer associated with the UE. Then it sends a Create Session Request (IMSI, MSISDN, MME TEID for control plane, PGW address, PDN Address, APN, RAT type, Default EPS Bearer QoS, PDN Type, APN-AMBR, EPS Bearer Identity, Protocol Configuration Options, Handover Indication, ME Identity (IMEISV), User Location Information (ECGI), UE Time Zone, User CSG Information, MS Info Change Reporting support indication, Selection Mode, Charging Characteristics, Trace Reference, Trace Type, Trigger ID, OMC Identity, Maximum APN Restriction, Dual Address Bearer Flag, the Protocol Type over S5/S8, Serving Network) message to the selected SGW. User CSG Information includes CSG ID, access mode and CSG membership indication.

The RAT type is provided in this message for the later PCC decision. The subscribed APN-AMBR for the APN is also provided in this message. The MSISDN is included if provided in the subscription data from the HSS. Handover Indication is included if the Request Type indicates handover. Selection Mode indicates whether a subscribed APN was selected, or a non-subscribed APN sent by the UE was selected. Charging Characteristics indicates which kind of charging the bearer context is liable for. The MME may change the requested PDN type according to the subscription data for this APN. The MME shall set the Dual Address Bearer Flag when the PDN type is set to IPv4v6 and all SGSNs which the UE may be handed over to are Release 8 or above supporting dual addressing, which is determined based on node pre-configuration by the operator. The Protocol Type over S5/S8 is provided to SGW, which protocol should be used over the S5/S8 interface.

The Charging Characteristics for the PS subscription and individually subscribed APNs as well as the way of handling Charging Characteristics and whether to send them or not to the PGW may be defined. The MME shall include Trace Reference, Trace Type, Trigger ID, and OMC Identity if SGW and/or PGW trace is activated. The MME shall copy Trace Reference, Trace Type, and OMC Identity from the trace information received from the HLR or OMC.

The Maximum APN Restriction denotes the most stringent restriction as may be imposed by any already active bearer context. If there are no already active bearer contexts, this value is set to the least restrictive type. If the PGW receives the Maximum APN Restriction, then the PGW shall check if the Maximum APN Restriction value does not conflict with the APN Restriction value associated with this bearer context request. If there is no conflict the request shall be allowed, otherwise the request shall be rejected with sending an appropriate error cause to the UE.

If the MME expects the eNB to check whether the UE radio capabilities are compatible with the network configuration (e.g., whether the SRVCC or frequency support by the UE matches that of the network) to be able to set the IMS voice over PS Session Supported Indication, then the MME may send a UE Radio Capability Match Request to the eNB.

Operation 2-13: Create Session Request. The SGW creates a new entry in its EPS bearer table and sends a Create Session Request (IMSI, MSISDN, APN, SGW Address for the user plane, SGW TEID of the user plane, SGW TEID of the control plane, RAT type, Default EPS Bearer QoS, PDN Type, PDN Address, subscribed APN-AMBR, EPS Bearer Identity, Protocol Configuration Options, Handover Indication, ME Identity, User Location Information (ECGI), UE Time Zone, User CSG Information, MS Info Change Reporting support indication, PDN Charging Pause Support indication, Selection Mode, Charging Characteristics, Trace Reference, Trace Type, Trigger ID, OMC Identity, Maximum APN Restriction, Dual Address Bearer Flag, Serving Network) message to the PGW indicated by the PGW address received in the previous operation. After this operation, the SGW buffers any downlink packets it may receive from the PGW without sending a Downlink Data Notification message to the MME until it receives the Modify Bearer Request message in Operation 2-23 below. The MSISDN is included if received from the MME.

PGWs shall not perform any checks of Maximum APN Restriction if Create Default Bearer Request includes the emergency APN.

Operation 2-14: IP-CAN Session Establishment/Modification. If dynamic PCC is deployed and the Handover Indication is not present, the PGW performs an IP-CAN Session Establishment procedure, and thereby obtains the default PCC rules for the UE. This may lead to the establishment of a number of dedicated bearers following the procedures in association with the establishment of the default bearer.

The IMSI, APN, UE IP address, User Location Information (ECGI), UE Time Zone, Serving Network, RAT type, APN-AMBR, Default EPS Bearer QoS, ETFTU (if ETFTU is not provided it means UE and/or the PGW does not support the extended TFT filter format) are provided to the PCRF by the PGW if received by the previous message. The User Location Information and UE Time Zone are used for location based charging. For emergency attached UEs which are unauthenticated the PGW provides the IMEI as the UE Identity instead of IMSI, to the PCRF. If the PCRF decides that the PDN connection may use the extended TFT filter format, it shall return the ETFTN indicator to the PGW for inclusion in the protocol Configuration Options returned to the UE.

The PCRF may modify the APN-AMBR and the QoS parameters (QCI and ARP) associated with the default bearer in the response to the PGW.

If the PCC is configured to support emergency services and if dynamic PCC is deployed, the PCRF, based on the emergency APN, sets the ARP of the PCC rules to a value that is reserved for emergency services and the authorization of dynamic PCC rules. If dynamic PCC is not deployed, the PGW uses the ARP of the default emergency EPS bearer for any potentially initiated dedicated emergency EPS bearer. The PGW determines that emergency services are requested based on the emergency APN received in a Create Session Request message.

If dynamic PCC is deployed and the Handover Indication is present, the PGW executes a PCEF Initiated IP-CAN Session Modification procedure with the PCRF to report the new IP-CAN type. Depending on the active PCC rules, the establishment of dedicated bearers for the UE may be desirable. The establishment of those bearers shall take place in combination with the default bearer activation. This procedure can continue without waiting for a PCRF response. If changes to the active PCC rules are desirable, the PCRF may provide them after the handover procedure is finished.

In both cases (Handover Indication is present or not), if dynamic PCC is not deployed, the PGW may apply local QoS policy. This may lead to the establishment of a number of dedicated bearers for the UE following the procedures in combination with the establishment of the default bearer.

If the CSG information reporting triggers are received from the PCRF, the PGW should set the CSG Information Reporting Action IE accordingly.

Operation 2-15: Create Session Response. The PGW creates a new entry in its EPS bearer context table and generates a Charging ID for the Default Bearer. The new entry allows the PGW to route user plane PDUs between the SGW and the packet data network, and to start charging.

The PGW returns a Create Session Response (PGW Address for the user plane, PGW TEID of the user plane, PGW TEID of the control plane, PDN Type, PDN Address, EPS Bearer Identity, EPS Bearer QoS, Protocol Configuration Options, Charging ID, Prohibit Payload Compression, APN Restriction, Cause, MS Info Change Reporting Action (Start) (if the PGW decides to receive UE's location information during the session), CSG Information Reporting Action (Start) (if the PGW decides to receive UE's User CSG information during the session), Presence Reporting Area Action (if the PGW decides to receive notifications about a change of UE presence in the Presence Reporting Area), PDN Charging Pause Enabled indication (if PGW has chosen to enable the function), APN-AMBR, Delay Tolerant Connection) message to the SGW. The PGW takes into account the received PDN type, the Dual Address Bearer Flag and the policies of the operator when the PGW selects the PDN type to be used as follows. If the received PDN type is IPv4v6 and both IPv4 and IPv6 addressing is possible in the PDN but the Dual Address Bearer Flag is not set, or only single IP version addressing for this APN is possible in the PDN, the PGW selects a single IP version (either IPv4 or IPv6). If the received PDN type is IPv4 or IPv6, the PGW uses the received PDN type if it is supported in the PDN, otherwise an appropriate error cause will be returned. The PGW allocates a PDN Address according to the selected PDN type. If the PGW has selected a PDN type different from the received PDN Type, the PGW indicates together with the PDN type IE a reason cause to the UE why the PDN type has been modified. PDN Address may contain an IPv4 address for IPv4 and/or an IPv6 prefix and an Interface Identifier. If the PDN has been configured by the operator so that the PDN addresses for the requested APN shall be allocated by usage of DHCPv4 only, or if the PGW allows the UE to use DHCPv4 for address allocation according to the Address Allocation Preference received from the UE, the PDN Address shall be set to 0.0.0.0, indicating that the IPv4 PDN address shall be negotiated by the UE with DHCPv4 after completion of the Default Bearer Activation procedure. For external PDN addressing for IPv6, the PGW obtains the IPv6 prefix from the external PDN using either RADIUS or Diameter client function. In the PDN Address field of the Create Session Response, the PGW includes the Interface Identifier and IPv6 prefix. The PGW sends Router Advertisement to the UE after default bearer establishment with the IPv6 prefix information for all cases.

If the PDN address is contained in the Create Session Request, the PGW shall allocate the IPv4 address and/or IPv6 prefix contained in the PDN address to the UE. The PGW derives the BCM based on the NRSU and operator policy. The PGW derives whether the extended TFT filter format is to be used based on the ETFTU, ETFTN received from the PCRF and operator policy. Protocol Configuration Options contains the BCM, ETFTN as well as optional PDN parameters that the PGW may transfer to the UE. These optional PDN parameters may be requested by the UE, or may be sent unsolicited by the PGW. Protocol Configuration Options are sent transparently through the MME.

The PGW includes a Delay Tolerant Connection indication if the PGW supports receiving a rejection cause from the SGW indicating that the UE is temporarily not reachable due to power saving and holding mobile terminated procedures, until the PGW receives a message indicating that the UE is available for end to end signalling.

When the Handover Indication is present, the PGW does not yet send downlink packets to the SGW; the downlink path is to be switched at Operation 2-23*a*.

If the PGW is an L-GW, it does not forward downlink packets to the SGW. The packets will only be forwarded to the HeNB at Operation 2-20 via the direct user plane path.

Operation 2-16: Create Session Response. The SGW returns a Create Session Response (PDN Type, PDN Address, SGW address for User Plane, SGW TEID for S1-U User Plane, SGW TEID for control plane, EPS Bearer Identity, EPS Bearer QoS, PGW addresses and TEIDs (GTP-based S5/S8) or GRE keys (PMIP-based S5/S8) at the PGW(s) for uplink traffic, Protocol Configuration Options, Prohibit Payload Compression, APN Restriction, Cause, MS Info Change Reporting Action (Start), Presence Reporting Area Action, CSG Information Reporting Action (Start), APN-AMBR, Delay Tolerant Connection) message to the new MME.

Operation 2-17: Initial Context Setup Request/Attach Accept. If an APN Restriction is received, then the MME shall store this value for the Bearer Context and the MME shall check this received value with the stored value for the Maximum APN Restriction to ensure there are no conflicts between values. If the Bearer Context is accepted, the MME shall determine a (new) value for the Maximum APN Restriction. If there is no previously stored value for Maximum APN Restriction, then the Maximum APN Restriction shall be set to the value of the received APN Restriction. MME shall not deactivate bearer(s) with emergency ARP, if present, to maintain valid APN restriction combination.

The PGW shall ignore Maximum APN restriction if the request includes the Emergency APN.

If the MS Info Change Reporting Action (Start) and/or the CSG Information Reporting Action (Start) are received for this bearer context, then the MME shall store this for the bearer context and the MME shall report to that PGW via the SGW whenever a UE's location and/or User CSG information change occurs that meets the PGW request. If Presence Reporting Area Action is received for this bearer context, the MME shall store this information for the bearer context and shall report to that PGW via the SGW whenever a change of UE presence in the Presence Reporting Area is detected.

The MME determines the UE AMBR to be used by the eNodeB based on the subscribed UE-AMBR and the APN-AMBR for the default APN.

If the new MME has not received, from Operation 2-12, Voice Support Match Indicator for the UE from the eNB then, based on implementation, the MME may set an IMS Voice over PS session supported Indication and update it at a later stage.

The new MME sends an Attach Accept (APN, GUTI, PDN Type, PDN Address, TAI List, EPS Bearer Identity, Session Management Request, Protocol Configuration Options, NAS sequence number, NAS-MAC, IMS Voice over PS session supported Indication, Emergency Service Support indicator, LCS Support Indication) message to the eNodeB. GUTI is included if the new MME allocates a new GUTI. This message is contained in an S1_MME control message Initial Context Setup Request. This S1 control message also includes the AS security context information for the UE, the Handover Restriction List, the EPS Bearer QoS, the UE-AMBR, and the EPS Bearer Identity, as well as the TEID at the SGW used for user plane and the address of the SGW for user plane. In addition, if the PDN connection is established for Local IP Access, the corresponding S1 control message includes a Correlation ID for enabling the direct user plane path between the HeNB and the L-GW. If the PDN connection is established for SIPTO at the Local Network with L-GW function collocated with the (H)eNB, the corresponding S1 control message includes a SIPTO Correlation ID for enabling the direct user plane path between the (H)eNB and the L-GW.

In the Attach Accept message, the MME does not include the IPv6 prefix within the PDN Address. The MME includes the EPS Bearer QoS parameter QCI and APN-AMBR into the Session Management Request. Furthermore, if the UE has UTRAN or GERAN capabilities and the network supports mobility to UTRAN or GERAN, the MME uses the EPS bearer QoS information to derive the corresponding PDP context parameters QoS Negotiated (R99 QoS profile), Radio Priority, Packet Flow ID and TI and includes them in the Session Management Request. If the UE indicated in the UE Network Capability it does not support BSS packet flow procedures, then the MME shall not include the Packet Flow ID. The MME sets the IMS Voice over PS session supported Indication. LCS Support Indication indicates whether the network supports the EPC-MO-LR and/or CS-MO-LR. The MME may include an indication whether the traffic of this PDN Connection is allowed to be offloaded to WLAN.

If the UE initiates the Attach procedure at a hybrid cell, the MME shall check whether the CSG ID is contained in the CSG subscription and is not expired. The MME shall send an indication whether the UE is a CSG member to the RAN along with the S1-MME control message. Based on this information, the RAN may perform differentiated treatment for CSG and non-CSG members.

If the MME or PGW has changed the PDN Type, an appropriate reason cause shall be returned to the UE.

If the UE included extended idle mode DRX parameters information element, the MME includes extended idle mode DRX parameters information element if it decides to enable extended idle mode DRX.

Operation 2-18: Connection Reconfiguration. The eNodeB sends the RRC Connection Reconfiguration message including the EPS Radio Bearer Identity to the UE, and the Attach Accept message will be sent along to the UE. The UE shall store the QoS Negotiated, Radio Priority, Packet Flow ID and TI, which it received in the Session Management Request, for use when accessing via GERAN or UTRAN. The APN is provided to the UE to notify it of the APN for which the activated default bearer is associated. The UE may provide EPS Bearer QoS parameters to the application handling the traffic flow(s). The application usage of the EPS Bearer QoS is implementation dependent. The UE shall not reject the RRC Connection Reconfiguration on the basis of the EPS Bearer QoS parameters contained in the Session Management Request.

If the attach procedure is initiated by manual CSG selection and occurs via a CSG cell, the UE upon receiving the Attach accept shall check if the CSG ID and associated PLMN of the cell where the UE has sent the Attach Request message is contained in its Allowed CSG list. If the CSG ID and associated PLMN are not in the UE's Allowed CSG list, the UE shall add the CSG ID and associated PLMN to its Allowed CSG list. Manual CSG selection is not supported when an emergency service has been initiated.

When receiving the Attach Accept message the UE shall set its TIN to "GUTI" as no ISR Activated is indicated.

If the UE receives an IPv4 address set to 0.0.0.0, it may negotiate the IPv4 address with DHCPv4. If the UE receives an IPv6 interface identifier, it may wait for the Router Advertisement from the network with the IPv6 prefix information or it may send a Router Solicitation if necessary.

Operation 2-19: Connection Reconfiguration Complete. The UE sends the RRC Connection Reconfiguration Complete message to the eNodeB.

Operation 2-20: Initial Context Setup Response. The eNodeB sends the Initial Context Response message to the new MME. This Initial Context Response message includes the TEID of the eNodeB and the address of the eNodeB used for downlink traffic on the S1_U reference point.

The MME shall be prepared to receive this message either before or after the Attach Complete message (sent in Operation 2-22).

If the Correlation ID or SIPTO Correlation ID was included in the Initial Context Setup Request message, the eNodeB shall use the included information to establish a direct user plane path with the L-GW and forward uplink data for Local IP Access or SIPTO at the Local Network with L-GW function collocated with the (H)eNB accordingly.

Operation 2-21: Direct Transfer. The UE sends a Direct Transfer message to the eNodeB, which includes the Attach Complete (EPS Bearer Identity, NAS sequence number, NAS-MAC) message.

Operation 2-22: Attach Complete. The eNodeB forwards the Attach Complete message to the new MME in an Uplink NAS Transport message.

After the Attach Accept message and once the UE has obtained a PDN Address, the UE can then send uplink packets towards the eNodeB which will then be tunnelled to the SGW and PGW. If the UE requested for a dual address PDN type (IPv4v6) to a given APN and was granted a single address PDN type (IPv4 or IPv6) by the network with a reason cause indicating that only single IP version per PDN connection is allowed to be sent together with the PDN type, the UE should request for the activation of a parallel PDN connection to the same APN with a single address PDN type (IPv4 or IPv6) other than the one already activated. If the UE receives a no reason cause in Operation 2-18 in response to an IPv4v6 PDN type and it receives an IPv6 Interface Identifier apart from the IPv4 address or 0.0.0.0 in the PDN Address field, it considers that the request for a dual address PDN was successful. It can wait for the Router Advertisement from the network with the IPv6 prefix information or it may send Router Solicitation if necessary.

Operation 2-23: Modify Bearer Request. Upon reception of both the Initial Context Response message in Operation 2-20 and the Attach Complete message in Operation 2-22, the new MME sends a Modify Bearer Request (EPS Bearer Identity, eNodeB address, eNodeB TEID, Handover Indication, Presence Reporting Area Information) message to the SGW. If the MME has been requested to report a change of UE presence in the Presence Reporting Area, the MME includes in this message the Presence Reporting Area Information comprising the area identifier and an indication on whether the UE is inside or outside the area.

Operation 2-23a: Modify Bearer Request. If the Handover Indication is included in Operation 2-23, the SGW sends a Modify Bearer Request (Handover Indication) message to the PGW to prompt the PGW to tunnel packets from non 3GPP IP access to 3GPP access system and immediately start routing packets to the SGW for the default and any dedicated EPS bearers established. If Presence Reporting Area Information is included in Operation 2-23, the SGW sends a Modify Bearer Request (Presence Reporting Area Information) message to the PGW.

Operation 2-23b: Modify Bearer Response. The PGW acknowledges by sending Modify Bearer Response to the SGW.

Operation 2-24: Modify Bearer Response. The SGW acknowledges by sending a Modify Bearer Response (EPS Bearer Identity) message to the new MME. The SGW can then send its buffered downlink packets.

If there is an "Availability after DDN Failure" monitoring event or a "UE Reachability" monitoring event configured for the UE in the EMM Context of the MME, the MME sends an event notification (see TS 23.682 [74] for further information).

Operation 2-25: Notify Request. After the MME receives a Modify Bearer Response (EPS Bearer Identity) message, if Request Type does not indicate handover and an EPS bearer was established and the subscription data indicates that the user is allowed to perform handover to non-3GPP accesses, and if the MME selected a PGW that is different from the PGW identity which was indicated by the HSS in the PDN subscription context, the MME shall send a Notify Request including the APN and PGW identity to the HSS for mobility with non-3GPP accesses. The message shall include information that identifies the PLMN in which the PGW is located.

If the ME identity of the UE has changed and Operation 2-8 has not been performed, the MME sends a Notify Request (ME Identity) message to inform the HSS of the updated ME identity.

After Operation 2-8, and in parallel with any of the preceding operations, the MME shall send a Notify Request (Homogeneous Support of IMS Voice over PS Sessions) message to the HSS.

Operation 2-26: Notify Response. The HSS stores the APN and PGW identity pair and sends a Notify Response to the MME.

Figure 3:
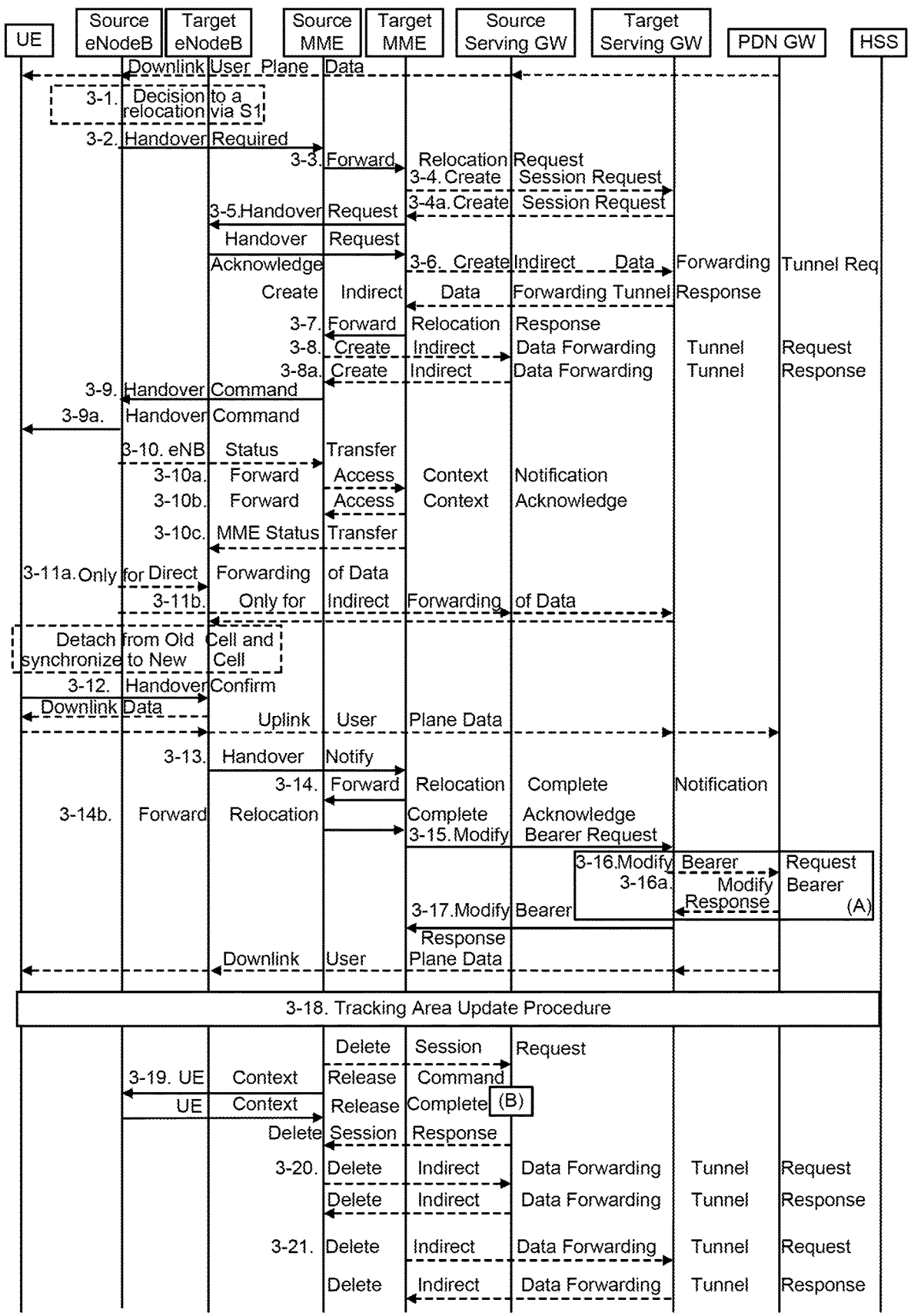
FIG. 3 is a diagram of a handover procedure of a network having a legacy architecture, such as the network of FIG. 1.

FIG. 3 is a diagram of a Handover procedure of a network having a legacy architecture, such as the network 100 of FIG. 1. The Handover procedure is an S1-based handover.

The S1-based handover procedure is used when the X2-based handover cannot be used. The source eNodeB initiates a handover by sending a Handover Required message over the S1-MME reference point. This procedure may relocate the MME and/or the SGW. The source MME selects the target MME. The MME should not be relocated during inter-eNodeB handover unless the UE leaves the MME Pool Area where the UE is served. The MME (target MME for MME relocation) determines if the SGW may be relocated. If the SGW can be relocated the MME selects the target SGW.

The source eNodeB decides which of the EPS bearers are subject for forwarding of downlink and optionally also uplink data packets from the source eNodeB to the target eNodeB. The EPC does not change the decisions taken by the RAN node. Packet forwarding can take place either directly from the source eNodeB to the target eNodeB, or indirectly from the source eNodeB to the target eNodeB via the source and target SGWs (or if the SGW is not relocated, only the single SGW).

The availability of a direct forwarding path is determined in the source eNodeB and indicated to the source MME. If X2 connectivity is available between the source and target eNodeBs, a direct forwarding path is available.

If a direct forwarding path is not available, indirect forwarding may be used. The source MME uses the indication from the source eNodeB to determine whether to apply indirect forwarding. The source MME indicates to the target MME whether indirect forwarding should apply. Based on this indication, the target MME determines whether it applies indirect forwarding.

If the MME receives a rejection to an S1 interface procedure (e.g., dedicated bearer establishment/modification/release; location reporting control; NAS message transfer; etc.) from the eNodeB with an indication that an S1 handover is in progress, the MME shall reattempt the same S1 interface procedure when the handover is complete or is deemed to have failed if the MME is still the serving MME, except in case of SGW relocation. If the S1 handover changes the serving MME, the source MME shall terminate any other ongoing S1 interface procedures except the handover procedure.

If the S1 handover includes the SGW relocation, and if the MME receives a rejection to a NAS message transfer for a Downlink NAS Transport or a Downlink Generic NAS Transport message from the eNodeB with an indication that an S1 handover is in progress, the MME should resend the corresponding message to the target eNodeB when the handover is complete or to the source eNodeB when the handover is deemed to have failed if the MME is still the serving MME.

If the MME receives a rejection to a NAS message transfer for a CS Service Notification or to a UE Context modification Request message with a CS Fallback indication from the eNodeB with an indication that an S1 handover is in progress, the MME shall resend the corresponding message to the target eNodeB when the handover is complete or to the source eNodeB when the handover is deemed to have failed if the MME is still the serving MME.

In order to minimize the number of procedures rejected by the eNodeB, the MME should pause non-handover related S1 interface procedures (e.g., downlink NAS message transfer, E-RAB Setup/Modify/Release, etc.) while a handover is ongoing (i.e., from the time that a Handover Required has been received until either the Handover procedure has succeeded (Handover Notify) or failed (Handover Failure)) and continue them once the Handover procedure has completed if the MME is still the serving MME, except in case of SGW relocation.

If during the handover procedure the MME detects that the SGW or/and the MME could be relocated, the MME shall reject any PGW initiated EPS bearer(s) request received since the handover procedure started and shall include an indication that the request has been temporarily rejected due to the handover procedure in progress. The rejection is forwarded by the SGW to the PGW, with the indication that the request has been temporarily rejected.

Upon reception of a rejection for an EPS bearer(s) PGW initiated procedure with an indication that the request has been temporarily rejected due to a handover procedure in progress, the PGW starts a locally configured guard timer. The PGW shall re-attempt, up to a pre-configured number of times, when it detects that the handover is completed or has failed using message reception, or at expiry of the guard timer.

If emergency bearer services are ongoing for the UE, handover to the target eNodeB is performed independent of the Handover Restriction List. The MME checks, as part of the Tracking Area Update in the execution phase, if the handover is to a restricted area and if so MME releases the non-emergency bearers.

If emergency bearer services are ongoing for the UE, handover to the target CSG cell is performed independent of the UE's CSG subscription. If the handover is to a CSG cell that the UE is not subscribed, the target eNodeB only accepts the emergency bearers and the target MME releases the non-emergency PDN connections that were not accepted by the target eNodeB.

For inter-PLMN handover to a CSG cell, if the source MME has the CSG-ID list of the target PLMN, the source MME shall use it to validate the CSG membership of the UE in the target CSG cell. Otherwise, based on the operator's configuration the source MME may allow the handover by validating the CSG membership of the UE in the target CSG cell using the CSG-ID list of the registered PLMN-ID. If neither the CSG-ID list of the target PLMN nor the operator's configuration permits the handover, the source MME shall reject the handover due to no CSG membership information of the target PLMN-ID.

The Handover procedure shown in FIG. 3 is now described.

Operation 3-1: Decision to a Relocation via S1. The source eNodeB decides to initiate an S1-based handover to the target eNodeB. This can be triggered, e.g., by no X2 connectivity to the target eNodeB, or by an error indication from the target eNodeB after an unsuccessful X2-based handover, or by dynamic information learned by the source eNodeB.

Operation 3-2: Handover Required. The source eNodeB sends Handover Required (Direct Forwarding Path Availability, Source to Target transparent container, target eNodeB Identity, CSG ID, CSG access mode, target TAI, S1 AP Cause) to the source MME. The source eNodeB indicates which bearers are subject to data forwarding. Direct Forwarding Path Availability indicates whether direct forwarding is available from the source eNodeB to the target eNodeB. This indication from the source eNodeB can be based on, e.g., the presence of X2. The target TAI is sent to MME to facilitate the selection of a suitable target MME. When the target cell is a CSG cell or a hybrid cell, the source eNodeB shall include the CSG ID of the target cell. If the target cell is a hybrid cell, the CSG access mode shall be indicated.

Operation 3-3: Forward Relocation Request. The source MME selects the target MME and if it has determined to relocate the MME, it sends a Forward Relocation Request (MME UE context, Source to Target transparent container, RAN Cause, target eNodeB Identity, CSG ID, CSG Membership Indication, target TAI, MS Info Change Reporting Action (if available), CSG Information Reporting Action (if available), UE Time Zone, Direct Forwarding Flag, Serving Network, Local Home Network ID) message to the target MME. The target TAI is sent to the target MME to help it determine whether SGW relocation is desirable (and, if so, aid SGW selection). The old Serving Network is sent to target MME to support the target MME to resolve if Serving Network is changed. In network sharing scenarios Serving Network denotes the serving core network.

The source MME shall perform access control by checking the UE's CSG subscription when CSG ID is provided by the source eNodeB. If there is no subscription data for this CSG ID or the CSG subscription is expired, and the target cell is a CSG cell, the source MME shall reject the handover with an appropriate cause unless the UE has emergency bearer services.

The MME UE context includes IMSI, ME Identity, UE security context, UE Network Capability, AMBR, Selected CN operator ID, APN restriction, SGW address and TEID for control signalling, and EPS Bearer context(s).

An EPS Bearer context includes the PGW addresses and TEIDs (for GTP-based S5/S8) or GRE keys (for PMIP-based S5/S8) at the PGW(s) for uplink traffic, APN, SGW addresses and TEIDs for uplink traffic, and TI.

If SIPTO at the Local Network is active for a PDN connection in the architecture with stand-alone GW the source MME shall include the Local Home Network ID of the source cell in the EPS Bearer context corresponding to the SIPTO at the Local Network PDN connection.

RAN Cause indicates the S1AP Cause as received from source eNodeB.

The source MME includes the CSG ID in the Forward Relocation Request when the target cell is a CSG or hybrid cell. When the target cell is a hybrid cell, or if there is one or several emergency bearers and the target cell is a CSG cell, the CSG Membership Indication indicating whether the UE is a CSG member shall be included in the Forward Relocation Request message.

The Direct Forwarding Flag indicates if direct forwarding is applied, or if indirect forwarding is going to be set up by the source side.

The target MME shall determine the Maximum APN restriction based on the APN Restriction of each bearer context in the Forward Relocation Request, and shall subsequently store the new Maximum APN restriction value.

If the UE receives only emergency services and the UE is UICCless, IMSI cannot be included in the MME UE context in the Forward Relocation Request message. For emergency attached UEs, if the IMSI cannot be authenticated, then the IMSI shall be marked as unauthenticated. Also, in this case, security parameters are included only if available.

Operation 3-4: Create Session Request. If the MME has been relocated, the target MME verifies whether the source SGW can continue to serve the UE. If not, it selects a new SGW. If the MME has not been relocated, the source MME decides on this SGW re-selection.

If the source SGW continues to serve the UE, no message is sent in this operation. In this case, the target SGW is identical to the source SGW.

If a new SGW is selected, the target MME sends a Create Session Request (bearer context(s) with PGW addresses and TEIDs (for GTP-based S5/S8) or GRE keys (for PMIP-based S5/S8) at the PGW(s) for uplink traffic, Serving Network, UE Time Zone) message per PDN connection to the target SGW. The target SGW allocates the SGW addresses and TEIDs for the uplink traffic on S1_U reference point (one TEID per bearer). The target SGW sends a Create Session Response (SGW addresses and uplink TEID(s) for user plane) message back to the target MME.

Operation 3-5: Handover Request/Request Acknowledge. The Target MME sends a Handover Request (EPS Bearers to Setup, AMBR, S1 AP Cause, Source to Target transparent container, CSG ID, CSG Membership Indication, Handover Restriction List) message to the target eNodeB. This message creates the UE context in the target eNodeB, including information about the bearers, and the security context. For each EPS Bearer, the Bearers to Setup includes SGW address and uplink TEID for user plane, and EPS Bearer QoS. If the direct forwarding flag indicates unavailability of direct forwarding and the target MME knows that there is no indirect data forwarding connectivity between source and target, the Bearers to Setup shall include a "Data forwarding not possible" indication for each EPS bearer. Handover Restriction List is sent if available in the Target MME.

S1AP Cause indicates the RAN Cause as received from source MME.

The Target MME shall include the CSG ID and CSG Membership Indication when provided by the source MME in the Forward Relocation Request message.

The target eNodeB sends a Handover Request Acknowledge (EPS Bearer Setup list, EPS Bearers failed to setup list Target to Source transparent container) message to the target MME. The EPS Bearer Setup list includes a list of addresses and TEIDs allocated at the target eNodeB for downlink traffic on S1-U reference point (one TEID per bearer) and addresses and TEIDs for receiving forwarded data if necessary. If the UE-AMBR is changed, e.g., all the EPS bearers which are associated with the same APN are rejected in the target eNodeB, the MME shall recalculate the new UE-AMBR and signal the modified UE-AMBR value to the target eNodeB.

If none of the default EPS bearers have been accepted by the target eNodeB, the target MME shall reject the handover.

If the target cell is a CSG cell, the target eNodeB shall verify the CSG ID provided by the target MME, and reject the handover with an appropriate cause if it does not match the CSG ID for the target cell. If the target eNodeB is in hybrid mode, it may use the CSG Membership Indication to perform differentiated treatment for CSG and non-CSG members. If the target cell is a CSG cell, and if the CSG Membership Indication is "non member," the target eNodeB only accepts the emergency bearers.

Operation 3-6: Create Indirect Data Forwarding Tunnel Request/Response. If indirect forwarding applies and the SGW is relocated, the target MME sets up forwarding parameters by sending Create Indirect Data Forwarding Tunnel Request (target eNodeB addresses and TEIDs for forwarding) to the SGW. The SGW sends a Create Indirect Data Forwarding Tunnel Response (target SGW addresses and TEIDs for forwarding) to the target MME. If the SGW is not relocated, indirect forwarding may be set up in Operation 3-8 below.

Indirect forwarding may be performed via a SGW which is different from the SGW used as the anchor point for the UE.

Operation 3-7: Forward Relocation Response. If the MME has been relocated, the target MME sends a Forward Relocation Response (Cause, Target to Source transparent container, SGW change indication, EPS Bearer Setup List, Addresses and TEIDs) message to the source MME. For indirect forwarding, this message includes SGW Address and TEIDs for indirect forwarding (source or target). SGW change indication indicates a new SGW has been selected.

Operation 3-8: Create Indirect Data Forwarding Tunnel Request/Response. If indirect forwarding applies, the source MME sends Create Indirect Data Forwarding Tunnel Request (addresses and TEIDs for forwarding) to the SGW. If the SGW is relocated it includes the tunnel identifier to the target SGW.

The SGW responds with a Create Indirect Data Forwarding Tunnel Response (SGW addresses and TEIDs for forwarding) message to the source MME.

Indirect forwarding may be performed via a SGW which is different from the SGW used as the anchor point for the UE.

Operation 3-9: Handover Command. The source MME sends a Handover Command (Target to Source transparent container, Bearers subject to forwarding, Bearers to Release) message to the source eNodeB. The Bearers subject to forwarding includes a list of addresses and TEIDs allocated for forwarding. The Bearers to Release includes the list of bearers to be released.

Operation 3-9a: Handover Command. The Handover Command is constructed using the Target to Source transparent container and is sent to the UE. Upon reception of this message the UE will remove any EPS bearers for which it did not receive the corresponding EPS radio bearers in the target cell.

Operation 3-10: eNB Status Transfer. The source eNodeB sends the eNodeB Status Transfer message to the target eNodeB via the MME(s) to convey the PDCP and HFN status of the E-RABs for which PDCP status preservation applies. The source eNodeB may omit sending this message if none of the E-RABs of the UE shall be treated with PDCP status preservation.

If there is an MME relocation the source MME sends this information to the target MME via the Forward Access Context Notification message which the target MME acknowledges. The source MME or, if the MME is relocated, the target MME, sends the information to the target eNodeB via the MME Status Transfer message.

Operation 3-11a/b: Forwarding of Data. The source eNodeB should start forwarding downlink data from the source eNodeB towards the target eNodeB for bearers subject to data forwarding. This may be either direct (Operation 3-11a) or indirect (Operation 3-11b) forwarding.

Operation 3-12: Handover Confirm. After the UE has successfully synchronized to the target cell, it sends a Handover Confirm message to the target eNodeB. Downlink packets forwarded from the source eNodeB can be sent to the UE. Also, uplink packets can be sent from the UE, which are forwarded to the target SGW and on to the PGW.

Operation 3-13: Handover Notify. The target eNodeB sends a Handover Notify (TAI+ECGI, Local Home Network ID) message to the target MME.

For SIPTO at the Local Network with stand-alone GW architecture, the target eNodeB shall include the Local Home Network ID of the target cell in the Handover Notify message.

Operation 3-14: Forward Relocation Complete Notification. If the MME has been relocated, the target MME sends a Forward Relocation Complete Notification message to the source MME. The source MME in response sends a Forward Relocation Complete Acknowledge message to the target MME. Regardless if MME has been relocated or not, a timer in source MME is started to supervise when resources in Source eNodeB are available and, if the SGW is relocated, also resources in Source SGW shall be released.

Upon receipt of the Forward Relocation Complete Acknowledge message the target MME starts a timer if the target MME allocated SGW resources for indirect forwarding.

Operation 3-15: Modify Bearer Request. The MME sends a Modify Bearer Request (eNodeB address and TEID allocated at the target eNodeB for downlink traffic on S1-U for the accepted EPS bearers, ISR Activated) message to the target SGW for each PDN connection, including the PDN connections that can be released. If the PGW requested UE's location and/or User CSG information (determined from the UE context), the MME also includes the User Location Information IE and/or User CSG Information IE in this message. If the UE Time Zone has changed, the MME includes the UE Time Zone IE in this message. If SGW is not relocated but the Serving Network has changed or if the MME has not received any old Serving Network information from the old MME, the MME includes the Serving Network IE in this message. For the case that neither MME nor SGW changed, if ISR was activated before this procedure MME should maintain ISR. The UE is informed about the ISR status in the Tracking Area Update procedure. If the SGW supports a Modify Access Bearers Request procedure and if there is no need for the SGW to send the signalling to the PGW, the MME may send a Modify Access Bearers Request (eNodeB address and TEID allocated at the target eNodeB for downlink traffic on S1-U for the accepted EPS bearers, ISR Activated) per UE to the SGW to optimize the signalling.

The MME releases the non-accepted dedicated bearers by triggering the bearer release procedure. If the SGW receives a DL packet for a non-accepted bearer, the SGW drops the DL packet and does not send a Downlink Data Notification to the MME.

If the default bearer of a PDN connection has not been accepted by the target eNodeB and there are other PDN connections active, the MME shall handle it in the same way as if all bearers of a PDN connection have not been accepted. The MME releases these PDN connections by triggering the MME requested PDN disconnection procedure.

When the Modify Bearer Request does not indicate ISR Activated the SGW deletes any ISR resources by sending a Delete Bearer Request to the other CN node that has bearer resources on the SGW reserved.

Operation 3-16: Modify Bearer Request. If the SGW is relocated, the target SGW assigns addresses and TEIDs (one per bearer) for downlink traffic from the PGW. It sends a Modify Bearer Request (SGW addresses for user plane and TEID(s), Serving Network, PDN Charging Pause Support Indication) message per PDN connection to the PGW(s). The SGW also includes User Location Information IE and/or UE Time Zone IE and/or User CSG Information IE if they are present in Operation 3-15. The SGW also includes Serving Network IE if it is present in Operation 3-4 or Operation 3-15. The SGW allocates DL TEIDs on S5/S8 even for non-accepted bearers. The PGW updates its context field and returns a Modify Bearer Response (Charging ID, MSISDN, PDN Charging Pause Enabled Indication (if PGW has chosen to enable the function), etc.) message to the target SGW. The MSISDN is included if the PGW has it stored in its UE context. The PGW starts sending downlink packets to the target GW using the newly received address and TEIDs. These downlink packets will use the new downlink path via the target SGW to the target eNodeB.

If the SGW is not relocated, but has received the User Location Information IE and/or UE Time Zone IE and/or User CSG Information IE and/or Serving Network IE from the MME in Operation 3-15, the SGW shall inform the PGW(s) about this information that can be used, e.g., for charging, by sending the message Modify Bearer Request (User Location Information IE, UE Time Zone IE, User CSG Information IE, Serving Network IE) to the PGW(s) concerned. A Modify Bearer Response message is sent back to the SGW.

If the SGW is not relocated and it has not received User Location Information IE nor UE Time Zone IE nor User CSG Information IE nor Serving Network IE from the MME in Operation 3-15, no message is sent in this operation and downlink packets from the SGW are immediately sent on to the target eNodeB.

If the SGW is relocated, the PGW shall send one or more "end marker" packets on the old path immediately after switching the path in order to assist the reordering function in the target eNodeB. The source SGW shall forward the "end marker" packets to the source eNodeB.

Operation 3-17: Modify Bearer Response. The SGW shall return a Modify Bearer Response (SGW address and TEID for uplink traffic) message to the MME as a response to a Modify Bearer Request message, or a Modify Access Bearers Response (SGW address and TEID for uplink traffic) as a response to a Modify Access Bearers Request message. If the SGW cannot serve the MME Request in the Modify Access Bearers Request message without S5/S8 signalling other than to unpause charging in the PGW or without corresponding Gxc signalling when PMIP is used over the S5/S8 interface, it shall respond to the MME indicating that the modifications are not limited to S1-U bearers, and the MME shall repeat its request using a Modify Bearer Request message per PDN connection.

If the SGW does not change, the SGW shall send one or more "end marker" packets on the old path immediately after switching the path in order to assist the reordering function in the target eNodeB.

Operation 3-18: Tracking Area Update Procedure. The UE initiates a Tracking Area Update procedure when one of the conditions listed in clause "Triggers for tracking area update" applies.

The target MME knows that it is a Handover procedure that has been performed for this UE as it received the bearer context(s) by handover messages and therefore the target MME performs only a subset of the TA update procedure; specifically, it excludes the context transfer procedures between source MME and target MME.

Operation 3-19: UE Context Release Command/Complete. When the timer started in Operation 3-14 expires the source MME sends a UE Context Release Command ( ) message to the source eNodeB. The source eNodeB releases its resources related to the UE and responds with a UE Context Release Complete ( ) message. When the timer started in Operation 3-14 expires and if the source MME received the SGW change indication in the Forward Relocation Response message, it deletes the EPS bearer resources by sending Delete Session Request (Cause, LBI, Operation Indication) messages to the Source SGW. The operation Indication flag is not set, that indicates to the Source SGW that the Source SGW shall not initiate a delete procedure towards the PGW. The Source SGW acknowledges with Delete Session Response ( ) messages. If ISR has been activated before this procedure, the cause indicates to the Source SGW that the Source SGW shall delete the bearer resources on the other old CN node by sending Delete Bearer Request message(s) to that CN node.

Operation 3-20: Delete Indirect Data Forwarding Tunnel Request/Response. If indirect forwarding was used then the expiry of the timer at source MME started at Operation 3-14 triggers the source MME to send a Delete Indirect Data Forwarding Tunnel Request message to the SGW to release the temporary resources used for indirect forwarding that were allocated at Operation 3-8.

Operation 3-21: Delete Indirect Data Forwarding Tunnel Request/Response. If indirect forwarding was used and the SGW is relocated, then the expiry of the timer at target MME started at Operation 3-14 triggers the target MME to send a Delete Indirect Data Forwarding Tunnel Request message to the target SGW to release temporary resources used for indirect forwarding that were allocated at Operation 3-6.

Figure 4:
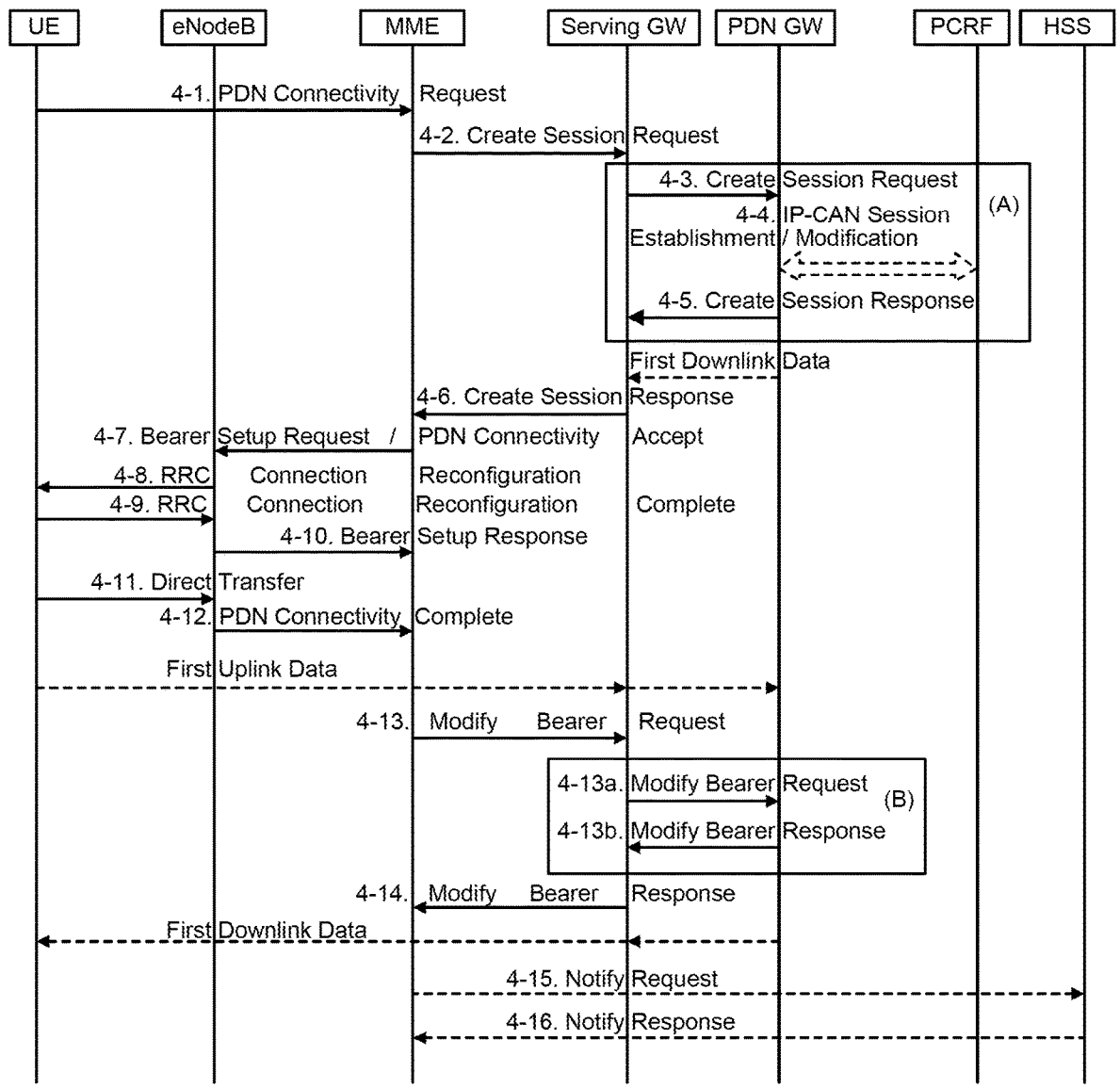
FIG. 4 is a diagram of a UE requested PDN connectivity procedure of a network having a legacy architecture, such as the network of FIG. 1.

FIG. 4 is a diagram of a UE Requested PDN Connectivity procedure of a network having a legacy architecture, such as the network 100 of FIG. 1. The UE Requested PDN Connectivity procedure for an E-UTRAN allows the UE to request for connectivity to an additional PDN over E-UTRAN including allocation of a default bearer, if the UE already has active PDN connections over E-UTRAN. This procedure is also used to request for connectivity to an additional PDN over E-UTRAN, if the UE is simultaneously connected to E-UTRAN and a non-3GPP access and the UE already has active PDN connections over both accesses. The PDN connectivity procedure may trigger one or multiple Dedicated Bearer Establishment procedures to establish dedicated EPS bearer(s) for that UE.

The UE Requested PDN Connectivity procedure shown in FIG. 4 is now described.

Operation 4-1: PDN Connectivity Request. The UE initiates the UE Requested PDN procedure by the transmission of a PDN Connectivity Request (APN, PDN Type, Protocol Configuration Options, Request Type) message. If the UE was in ECM-IDLE mode, this NAS message is preceded by the Service Request procedure. PDN type indicates the requested IP version (IPv4, IPv4v6, IPv6). The MME verifies that the APN provided by UE is allowed by subscription. If the UE did not provide an APN, the MME shall use the APN from the default PDN subscription context, and use this APN for the remainder of this procedure. Protocol Configuration Options (PCO) are used to transfer parameters between the UE and the PGW, and are sent transparently through the MME and the SGW. The Protocol Configuration Options may include the Address Allocation Preference, which indicates that the UE prefers to obtain an IPv4 address only after the default bearer activation by means of DHCPv4. If the UE has UTRAN or GERAN capabilities, it shall send the NRSU in the PCO to indicate the support of the network requested bearer control in UTRAN/GERAN. The UE sends the ETFTU in the PCO to indicate the support of the extended TFT filter format. The Request Type indicates "initial request" if the UE requests new additional PDN connectivity over the 3GPP access network for multiple PDN connections, the Request Type indicates "handover" when the UE is performing a handover from non-3GPP access and the UE has already established connectivity with the PDN over the non-3GPP access.

If the message is being sent via a HeNB which has a collocated L-GW, it includes the L-GW address in the Uplink NAS transport message to the MME.

Operation 4-2: Create Session Request. If the MME receives a PDN Connectivity Request from an emergency attached UE or the PDN Connectivity Request is for normal services and the mobility or access restrictions do not allow the UE to access normal services, the MME shall reject this request.

If the Request Type indicates "Handover," the MME uses the PGW stored in the Subscription Data retrieved by the MME during the Update Location performed at attach. If the Request Type indicates "initial request" the MME selects a PGW.

If the UE provided APN is authorized for LIPA according to the user subscription, the MME shall use the CSG Subscription Data to authorize the connection.

The MME allocates a Bearer ID, and sends a Create Session Request (IMSI, MSISDN, MME TEID for control plane, RAT type, PGW address, PDN Address, Default EPS Bearer QoS, PDN Type, subscribed APN-AMBR, APN, EPS Bearer ID, Protocol Configuration Options, Handover Indication, ME Identity, User Location Information (ECGI), UE Time Zone, User CSG Information, MS Info Change Reporting support indication, Selection Mode, Charging Characteristics, Trace Reference, Trace Type, Trigger ID, OMC Identity, Maximum APN Restriction, Dual Address Bearer Flag) message to the SGW.

The RAT type is provided in this message for the later PCC decision. The MSISDN is included if the MME has it stored for that UE. Handover Indication is included if the Request Type indicates "handover." Selection Mode indicates whether a subscribed APN was selected, or a non-subscribed APN sent by the UE was selected. The PGW may use Selection Mode when deciding whether to accept or reject the default bearer activation. For example, if an APN requires subscription, the PGW is configured to accept only the default bearer activation that requests a subscribed APN as indicated by Selection Mode. Charging Characteristics indicates which kind of charging the bearer context is liable for.

The MME shall include Trace Reference, Trace Type, Trigger ID, and OMC Identity if SGW and/or PGW trace is activated. The MME shall copy Trace Reference, Trace Type, and OMC Identity from the trace information received from the HLR or OMC.

The Maximum APN Restriction denotes the most stringent restriction as required by any already active bearer context. If there are no already active bearer contexts, this value is set to the least restrictive type. If the PGW receives the Maximum APN Restriction, then the PGW shall check if the Maximum APN Restriction value does not conflict with the APN Restriction value associated with this bearer context request. If there is no conflict the request shall be allowed, otherwise the request shall be rejected with sending an appropriate error cause to the UE.

If the PDN subscription context contains a subscribed IPv4 address and/or IPv6 prefix, the MME indicates it in the PDN address. The MME may change the requested PDN type according to the subscription data for this APN. The MME shall set the Dual Address Bearer Flag when the PDN type is set to IPv4v6 and all SGSNs which the UE may be handed over to are Release 8 or above supporting dual addressing, which is determined based on node pre-configuration by the operator.

Operation 4-3: Create Session Request. The SGW creates a new entry in its EPS Bearer table and sends a Create Session Request (IMSI, MSISDN, SGW Address for the user plane, SGW TEID of the user plane, SGW TEID of the control plane, RAT type, Default EPS Bearer QoS, PDN Type, PDN Address, subscribed APN-AMBR, APN, Bearer ID, Protocol Configuration Options, Handover Indication, ME Identity, User Location Information (ECGI), UE Time Zone, User CSG Information, MS Info Change Reporting support indication, PDN Charging Pause Support indication, Selection Mode, Charging Characteristics, Trace Reference, Trace Type, Trigger ID, OMC Identity, Maximum APN Restriction, Dual Address Bearer Flag) message to the PGW indicated in the PGW address received in the previous operation. After this operation, the SGW buffers any downlink packets it may receive from the PGW until it receives the message in Operation 4-13 below. The MSISDN is included if received from the MME. If the Handover Indication is included, the SGW includes it in the Create Session Request message.

PGWs shall not perform any checks of Maximum APN Restriction if Create Default Bearer Request includes emergency APN.

Operation 4-4: IP-CAN Session Establishment/Modification. If dynamic PCC is deployed and the Handover Indication is not present, the PGW may employ an IP CAN Session Establishment procedure with the PCRF to get the default PCC rules for the UE. This may lead to the establishment of a number of dedicated bearers in association with the establishment of the default bearer.

The RAT type is provided to the PCRF by the PGW if received by the previous message. If the PGW/PCEF is configured to activate predefined PCC rules for the default bearer, the interaction with the PCRF is not required (e.g., operator may configure to do this) at the moment.

The ETFTU is provided to the PCRF by the PGW, if received in the PCO from the UE and the PGW supports the extended TFT filter format. If the PCRF decides that the PDN connection may use extended TFT filters, it shall return the ETFTN indicator to the PGW for inclusion in the protocol Configuration Options returned to the UE.

The PCRF may modify the APN-AMBR and the QoS parameters (QCI and ARP) associated with the default bearer in the response to the PGW.

If the PCC is configured to support emergency services and dynamic PCC is deployed, the PCRF, based on the Emergency APN, sets the ARP of the PCC rules to a value that is reserved for emergency services and the authorization of dynamic PCC rules. If dynamic PCC is not deployed, the PGW is configured to set the ARP to a value that is reserved for emergency services.

If dynamic PCC is deployed and the Handover Indication is present, the PGW executes a PCEF Initiated IP-CAN Session Modification procedure with the PCRF to report the new IP-CAN type. Depending on the active PCC rules, the establishment of a dedicated bearer for the UE may be desirable. The establishment of those bearers shall take place in combination with the default bearer activation. This procedure can continue without waiting for a PCRF response. If changes to the active PCC rules are required, the PCRF may provide them after the handover procedure is finished.

In both cases (Handover Indication is present or not), if dynamic PCC is not deployed, the PGW may apply local QoS policy. This may lead to the establishment of a number of dedicated bearers for the UE in combination with the establishment of the default bearer.

If the CSG information reporting triggers are received from the PCRF, the PGW should set the CSG Information Reporting Action IE accordingly.

Operation 4-5: Create Session Response. The PGW creates a new entry in its EPS bearer context table and generates a Charging ID for the Default Bearer. The new entry allows the PGW to route user plane PDUs between the SGW and the packet data network, and to start charging.

The PGW returns a Create Session Response (PGW Address for the user plane, PGW TEID of the user plane, PGW TEID of the control plane, PDN Type, PDN Address, EPS Bearer ID, EPS Bearer QoS, Protocol Configuration Options, Charging ID, Prohibit Payload Compression, APN Restriction, Cause, MS Info Change Reporting Action (Start) (if the PGW decides to receive UE's location information during the session), CSG Information Reporting Action (Start) (if the PGW decides to receive UE's User CSG information during the session), Presence Reporting Area Action (if the PGW decides to receive notifications about a change of UE presence in the Presence Reporting Area), PDN Charging Pause Enabled indication (if PGW has chosen to enable the function), APN-AMBR, Delay Tolerant Connection) message to the SGW. The PGW takes into account the received PDN type, the Dual Address Bearer Flag and the policies of operator when the PGW selects the PDN type to be used as follows. If the received PDN type is IPv4v6 and both IPv4 and IPv6 addressing is possible in the PDN but the Dual Address Bearer Flag is not set, or only single IP version addressing for this APN is possible in the PDN, the PGW selects a single IP version (either IPv4 or IPv6). If the received PDN type is IPv4 or IPv6, the PGW uses the PDN type if it is supported in the PDN, otherwise an appropriate error cause will be returned. The PGW allocates a PDN Address according to the selected PDN Type If the PGW has selected a PDN type different from the received PDN Type, the PGW indicates together with the PDN type IE a reason cause to the UE why the PDN type has been modified. PDN Address may contain an IPv4 address for IPv4 and/or an IPv6 prefix and an Interface Identifier. If the PDN has been configured by the operator so that the PDN addresses for the requested APN shall be allocated by usage of DHCPv4 only, or if the PGW allows the UE to use DHCPv4 for address allocation according to the Address Allocation Preference received from the UE, the PDN Address shall be set to 0.0.0.0, indicating that the IPv4 address shall be negotiated by the UE after completion of the Default Bearer Activation procedure. For external PDN addressing for IPv6, the PGW obtains the IPv6 prefix from the external PDN using either RADIUS or Diameter client function. In the PDN Address field of the Create Session Response, the PGW includes the Interface Identifier and IPv6 prefix. The PGW sends Router Advertisement to the UE after default bearer establishment with the IPv6 prefix information for all cases. If the PDN address is contained in the Create Session Request, the PGW shall allocate the IPv4 address and/or IP6 prefix contained in the PDN address to the UE. If Handover Indication indicates "Handover," the PDN Address Information shall contain the same IP address the UE obtained during PDN connectivity establishment over the non-3GPP access. The PGW derives the BCM based on the NRSU and operator policy. The PGW derives whether the extended TFT filter format is to be used based on the ETFTU, ETFTN received from the PCRF and operator policy. Protocol Configuration Options contains the BCM, ETFTN, and optional PDN parameters that the PGW may transfer to the UE. These optional PDN parameters may be requested by the UE, or may be sent unsolicited by the PGW. Protocol Configuration Options are sent transparently through the MME.

The PGW includes a Delay Tolerant Connection indication if the PGW supports receiving a rejection cause from the SGW indicating that the UE is temporarily not reachable due to power saving, and holding mobile terminated procedures until the PGW receives a message indicating that the UE is available for end to end signalling.

When the Handover Indication is present, the PGW does not yet send downlink packets to the SGW; the downlink path is to be switched at Operation 4-13a.

If the PGW is an L-GW, it does not forward downlink packets to the SGW. The packets will only be forwarded to the HeNB at Operation 4-10 via the direct user plane path for Local IP Access.

Operation 4-6: Create Session Response. The SGW returns a Create Session Response (PDN Type, PDN Address, SGW address for User Plane, SGW TEID for User Plane, SGW TEID for control plane, EPS Bearer ID, EPS Bearer QoS, PGW address and TEID (GTP-based S5/S8) or GRE key (PMIP-based S5/S8) at the PGW for uplink traffic, Protocol Configuration Options, Prohibit Payload Compression, APN Restriction, Cause, MS Info Change Reporting Action (Start), CSG Information Reporting Action (Start), Presence Reporting Area Action, APN-AMBR, DTC) message to the MME. The DL TFT for PMIP-based S5/S8 is obtained from interaction between the SGW and the PCRF, when PCC is deployed; otherwise, the DL TFT IE is wildcarded, matching any downlink traffic. If the UE indicates the Request Type as "Handover," this message also serves as an indication to the MME that the S5/S8 bearer setup and update has been successful. At this operation the GTP tunnel(s) over S5/S8 are established.

Operation 4-7: Bearer Setup Request. If an APN Restriction is received, then the MME shall store this value for the Bearer Context and the MME shall check this received value with the stored value for the Maximum APN Restriction to ensure there are no conflicts between values. If the consequence of this check results in the PDN connectivity being rejected, the MME shall initiate a Bearer Deactivation and return an appropriate error cause. If the PDN Connectivity Request is accepted, the MME shall determine a (new) value for the Maximum APN Restriction. If there is no previously stored value for Maximum APN Restriction, then the Maximum APN Restriction shall be set to the value of the received APN Restriction.

The PGW shall ignore Maximum APN restriction if the request includes the Emergency APN.

For emergency service MME shall not deactivate bearer(s), if present, to maintain valid APN restriction combination.

If the MS Info Change Reporting Action (Start) and/or the CSG Information Reporting Action (Start) are received for this bearer context, then the MME shall store this for the bearer context and the MME shall report to that PGW via the SGW whenever a UE's Location Information and/or User CSG Information change occurs that meets the PGW request. If Presence Reporting Area Action is received for this bearer context, the MME shall store this information for the bearer context and shall report to that PGW via the SGW whenever a change of UE presence in the Presence Reporting Area is detected.

The MME may modify the UE-AMBR, which has been assigned to the eNodeB, based on the subscribed UE-AMBR and the updated set of APN-AMBRs in use.

The MME sends PDN Connectivity Accept (APN, PDN Type, PDN Address, EPS Bearer ID, Session Management Request, Protocol Configuration Options) message to the UE. This message is contained in an S1_MME control message Bearer Setup Request (EPS Bearer QoS, UE-AMBR, PDN Connectivity Accept, S1-TEID) to the eNodeB. This S1 control message includes the TEID at the SGW used for user plane and the address of the SGW for user plane. In addition, if the PDN connection is established for Local IP Access, the corresponding S1 control message includes a Correlation ID for enabling the direct user plane path between the HeNB and the L-GW. If the PDN connection is established for SIPTO at the Local Network with L-GW function collocated with the (H)eNB, the corresponding S1 control message includes a SIPTO Correlation ID for enabling the direct user plane path between the (H)eNB and the L-GW.

In the PDN Connectivity Accept message, the MME does not include the IPv6 prefix within the PDN Address. The MME includes the APN-AMBR and the EPS Bearer QoS parameter QCI into the Session Management Request. Furthermore, if the UE has UTRAN or GERAN capabilities and the network supports mobility to UTRAN or GERAN, the MME uses the EPS bearer QoS parameters to derive the corresponding PDP context parameters QoS Negotiated (R99 QoS profile), Radio Priority, Packet Flow ID and TI and includes them in the Session Management Request. If the UE indicated in the UE Network Capability that it does not support BSS packet flow procedures, then the MME shall not include the Packet Flow ID. MME will not send the S1 Bearer Setup Request message until any outstanding S1 Bearer Setup Response message for the same UE has been received or timed out. If the APN-AMBR has changed, the MME may update the UE-AMBR if appropriate. The MME may include an indication whether the traffic of this PDN Connection is allowed to be offloaded to WLAN.

If the MME or PGW has changed the PDN Type, an appropriate reason cause shall be returned to the UE.

Operation 4-8: RRC Connection Reconfiguration. The eNodeB sends RRC Connection Reconfiguration to the UE including the PDN Connectivity Accept message. The UE shall store the QoS Negotiated, Radio Priority, Packet Flow ID and TI, which it received in the Session Management Request IE, for use when accessing via GERAN or UTRAN. The UE may provide EPS Bearer QoS parameters to the application handling the traffic flow. The application usage of the EPS Bearer QoS is implementation dependent. The UE shall not reject the RRC Connection Reconfiguration on the basis of the EPS Bearer QoS parameters contained in the Session Management Request.

If the UE receives an IPv4 address set to 0.0.0.0, it may negotiate the IPv4 address with DHCPv4. If the UE receives an IPv6 interface identifier, it may wait for the Router Advertisement from the network with the IPv6 prefix information or it may send a Router Solicitation if necessary.

Operation 4-9: RRC Connection Reconfiguration Complete. The UE sends the RRC Connection Reconfiguration Complete to the eNodeB.

Operation 4-10: Bearer Setup Response. The eNodeB sends an S1-AP Bearer Setup Response to the MME. The S1-AP message includes the TEID of the eNodeB and the address of the eNodeB used for downlink traffic on the S1 U reference point.

If the Correlation ID or SIPTO Correlation ID is included in the Bearer Setup Request, the eNodeB shall use the included information to establish a direct user plane path to the L-GW and forward uplink data for Local IP Access or SIPTO at the Local Network with L-GW function collocated with the (H)eNB accordingly.

Operation 4-11: Direct Transfer. The UE NAS layer builds a PDN Connectivity Complete message including EPS Bearer Identity. The UE then sends a Direct Transfer (PDN Connectivity Complete) message to the eNodeB.

Operation 4-12: PDN Connectivity Complete. The eNodeB sends an Uplink NAS Transport (PDN Connectivity Complete) message to the MME.

After the PDN Connectivity Accept message, and once the UE has obtained a PDN Address Information, the UE can then send uplink packets towards the eNodeB which will then be tunnelled to the SGW and PGW. If the UE requested for a dual address PDN type (IPv4v6) to a given APN and was granted a single address PDN type (IPv4 or IPv6) by the network with a reason cause indicating that only a single IP version per PDN connection is allowed, the UE should request for the activation of a parallel PDN connection to the same APN with a single address PDN type (IPv4 or IPv6) other than the one already activated. If the UE receives no reason cause in Operation 4-8 in response to a IPv4v6 PDN type and it receives an IPv6 Interface Identifier apart from the IPv4 address or 0.0.0.0 in the PDN Address field, it considers that the request for a dual address PDN was successful. It can wait for the Router Advertisement from the network with the IPv6 prefix information or it may send Router Solicitation if necessary.

Operation 4-13: Modify Bearer Request. Upon reception of the Bearer Setup Response message in Operation 4-10 and the PDN Connectivity Complete message in Operation 4-12, the MME sends a Modify Bearer Request (EPS Bearer Identity, eNodeB address, eNodeB TEID, Handover Indication, Presence Reporting Area Information) message to the SGW. If Request Type indicates "handover," the Handover Indication is also included. If the MME has been requested to report a change of UE presence in the Presence Reporting Area, the MME includes in this message the Presence Reporting Area Information comprising the area identifier and an indication of whether the UE is inside or outside the area.

Operation 4-13*a*: Modify Bearer Request. If the Handover Indication is included in Operation 4-13, the SGW sends a Modify Bearer Request (Handover Indication) message to the PGW to prompt the PGW to tunnel packets from non 3GPP IP access to 3GPP access system and immediately start routing packets to the SGW for the default and any dedicated EPS bearers established. If Presence Reporting Area Information is included in Operation 4-13, the SGW sends a Modify Bearer Request (Presence Reporting Area Information) message to the PGW.

Operation 4-13*b*: Modify Bearer Response. The PGW acknowledges by sending Modify Bearer Response to the SGW.

Operation 4-14: Modify Bearer Response. The SGW acknowledges by sending Modify Bearer Response (EPS Bearer Identity) to the MME. The SGW can then send its buffered downlink packets.

Operation 4-15: Notify Request. After the MME receives Modify Bearer Response in Operation 4-14, if Request type does not indicate handover and an EPS bearer was established, and if the subscription data indicates that the user is allowed to perform handover to non-3GPP accesses, and if this is the first PDN connection associated with this APN, and if the MME selected a PGW that is different from the PGW identity which was previously indicated by the HSS in the PDN subscription context, the MME shall send a Notify Request including the PGW address and the APN to the HSS for mobility with non-3GPP accesses. The message shall include information that identifies the PLMN in which the PGW is located.

Operation 4-16: Notify Response. The HSS stores the PGW identity and the associated APN, and sends a Notify Response to the MME.

As noted and described above, legacy SGW and PGW implementations tightly couple the control plane and user plane, so there is no need to allocate IP address and TEID for both control plane and user plane separately. The architecture subgroup of the technical specification group on service and systems aspects (SA2) new system information (SI) feasibility study on control and user plane separation (FS_CUPS) aims to split the control plane and user plane functionality of SGW, PGW, and traffic detection function (TDF), as a consequence, the SGW control plane (SGW-C)/PGW control plane (PGW-C) and SGW user plane (SGW-U)/PGW user plane (PGW-U) may take some responsibility from legacy SGW/PGW. The IP address and TEID allocation for control plane may assume partial functionality of SGW-C/PGW-C, but the IP address and TEID allocation for user plane may be studied and evaluated.

The present disclosure provides systems, devices, and methods for IP address and TEID allocation for user plane nodes, such as a SGW-U and a PGW-U, in a core network of a system providing wireless communication services.

Figure 5:
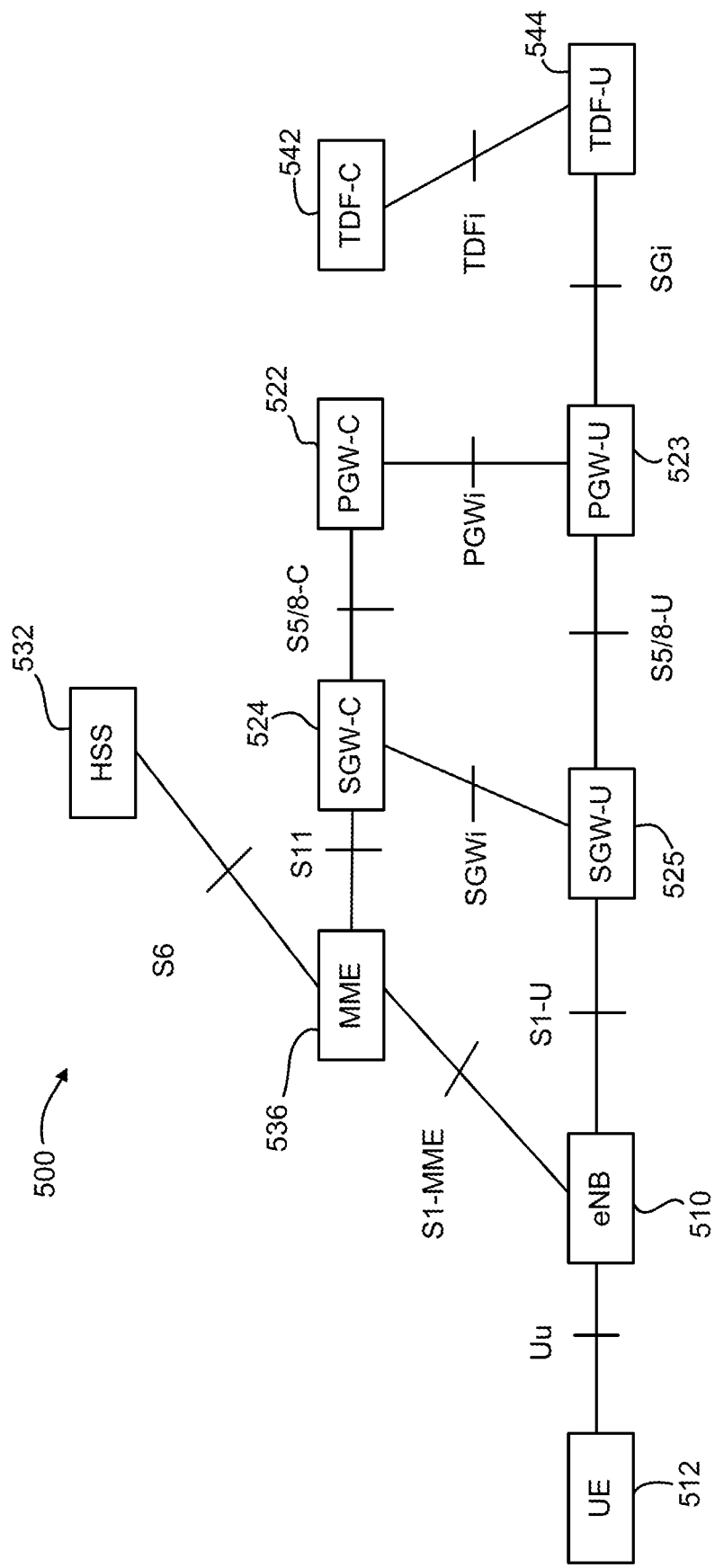
FIG. 5 is a block diagram of an architecture of a network, according to one embodiment of the present disclosure.

FIG. 5 is a block diagram of an architecture of a network 500, according to one embodiment of the present disclosure. The network 500 includes eNodeBs 510, to connect to UEs 512 utilizing a radio access technology RAT. The various network elements are interconnected by means of interfaces. The network 500 also includes several nodes, which may include a MME 536, a HSS 532, a traffic detection function element (TDF) control plane (TDF-C) 542, a TDF user plane (TDF-U) 544, a PGW-C 522, a PGW-U 523, a SGW-C 524, and a SGW-U 525. The MME 536 and HSS 532 may be similar to the MME 136 and HSS 132, respectively, described above with reference to FIG. 1.

The TDF-C 542 and/or TDF-U 544 couples the network 500 to a PDN (not shown). The TDF-C 542 and/or TDF-U 544 enable an operator to view critical data across the PDN networks and obtain actionable subscriber insight. By enabling operators to easily identify the subscriber, the application, and content in use, as well as the device, TDF-C 542 and/or TDF-U 544 enable personalized application-based service tiers and offerings that uniquely match subscriber preferences, such as tailored gaming, social networking, video streaming and other services. The network visibility can provide greater flexibility in managing quality of service, charging for use, and steering traffic. For example, the TDF-C 542 and/or TDF-U 544 may enable personalized pricing plans. In addition to introducing new pricing plans, the TDF-C 542 and/or TDF-U 544 enable operators to create device-based service offerings. For example, operators can identify mobile tethering and apply a premium charging plan. Finally, the TDF-C 542 and/or TDF-U 544 may allow an operator to enhance the quality of service for applications like VoIP or video streaming, and then charge more for premium experiences.

Embodiments of the present disclosure include gateway arrangements for wireless communication networks, including systems and methods for separating user plane and control plane functionality of a SGW and systems and methods for separating user plane in control plane functionality of a PGW in a wireless communication network.

The user plane of a component of a wireless communication network includes functions for transporting user data through the network. The control plane of a component of a wireless network includes protocols for control and support of the user plane functions. Examples of control plane functions may include controlling network access connections (e.g., such as attaching a UE to and detaching the UE from a radio access network), controlling attributes of an established network access connection (e.g., activating an Internet Protocol (IP) address), controlling the routing path of an established network connection, and controlling the assignment of network resources to meet demand.

The PGW-C 522 and the PGW-U 523 may collectively provide similar functionality and/or hardware of a PGW, such as the PGW 122 of FIG. 1, yet separated according to the control plane and the user plane. Functions of the PGW-C 522 and/or the PGW-U 523 may include per-user based packet filtering, allocating of IP addresses to UEs 512, transport level packet marking in the uplink and downlink, uplink and downlink service level gating control, and packet screening, among others.

The SGW-C 524 and the SGW-U 525 may collectively provide similar functionality and/or hardware of a SGW, such as the SGW 124 of FIG. 1, yet separated according to the control plane and the user plane. Functions of the SGW-C 524 and/or the SGW-U 525 may include acting as a local mobility anchor point for handover of UEs 512 between eNBs 510, packet routing and forwarding, transport level packet marking in the uplink and the downlink, among others.

The network 500 also includes various interfaces over which the various nodes communicate, including the S1-MME interface between the eNB 510 and the MME 536, the S6 interface between the MME 536 and the HSS 532, the S11 interface between the SGW-C 524 and the MME 536, the S1-U interface between the eNB 510 and the SGW-U 525, the S5/8-C interface between the SGW-C 524 and the PGW-C 522, the S5/8-U interface between the SGW-U 525 and the PGW-U 523, the SGWi interface between the SGW-C 524 and the SGW-U 525, the PGWi interface between the PGW-C 522 and the PGW-U 523, the SGi interface between the PGW-U 523 and the TDF-U 544, and the TDFi interface betwwen the TDF-U 544 and the TDF-C 542.

Various embodiments disclosed herein may implement the control plane of various network functions as a software defined network (SDN) cloud service. In particular, various ones of the embodiments disclosed herein may separate the control plane and user plane of various network functions, and may utilize cloud-based processing to provide the control plane of the network functions (e.g., within an EPC controller), while the user plane functions are provided by special-purpose hardware or other computing systems coupled to the control plane by a communication link.

In particular, some of the embodiments disclosed herein may enable the virtualization of various network functions previously implemented by special-purpose hardware. Conventionally, when demand increases on a wireless network, additional units of such special purpose hardware must be purchased, shipped, installed, and configured in order to respond to the increased demand. Virtualization of some of the functions performed by conventional special-purpose hardware may enable new instantiations of the functionality to be created quickly and at much lower cost, thereby improving the ability of providers to respond to changes in demand.

However, replacing special-purpose hardware with a virtualized counterpart may come at the cost of higher processing overhead and therefore slower performance. Thus, in various embodiments disclosed herein time-sensitive functionality may continue to be implemented with special-purpose hardware, while less time-sensitive functionality may be virtualized. For example, user plane functionality (such as the transport of voice data packets) may be particularly time-sensitive in the sense that only a small amount of delay in packet delivery is tolerated, while control plane functionality may be less time-sensitive (e.g., five seconds of delay in establishing a voice call may be acceptable, but five seconds of delay during active voice communication may not be acceptable). Decoupling the computing systems used to provide the user plane functionality and the control plane functionality can enable improved responsiveness to changes in demand without sacrificing the performance of time-sensitivefunctions.

Separation of the control plane and the user plane creates the SGWi interface and the PGWi interface between the PGW-C 522 and the PGW-U 523. IP addresses for the user plane should be generated to enable communication over these interfaces. The present disclosure provides systems, devices, and methods to allocate internet protocol (IP) address and tunnel endpoint identifier (TEID) for both control plane and user plane separately.

In other embodiments, a SGW-C and a PGW-C can be collocated in the cloud and therefore there may not be a S5/8-C interface, and the signaling interaction between a SGW-C and a PGW-C can be ignored in the call flows figures in following sections.

In other embodiments, a SGW-U and a PGW-U can also be collocated, thus the S5/8-U interface may not be present, and the SGWi interface and PGWi interface may be combined into one interface.

Figure 6:
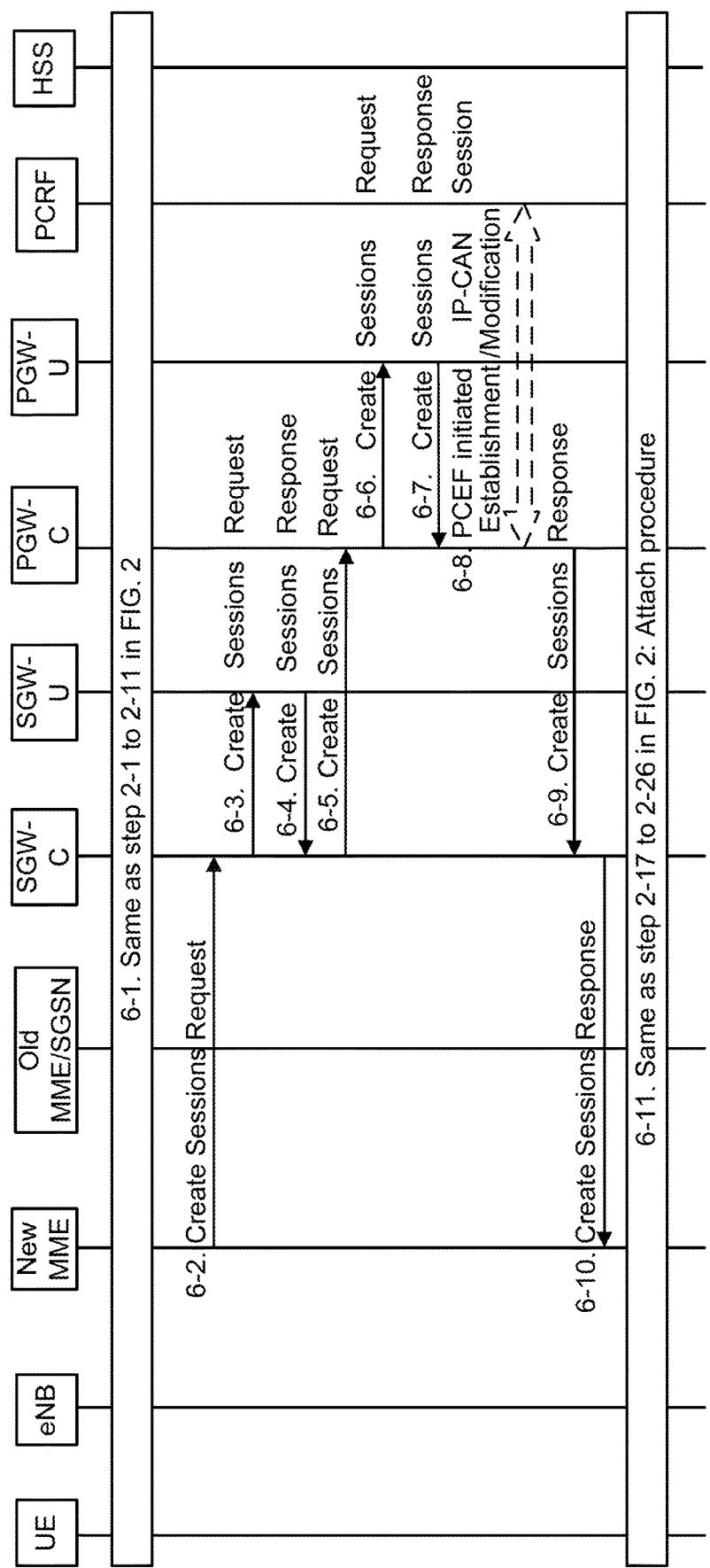
FIG. 6 is a diagram of an attach procedure, according to one embodiment of the present disclosure.

FIG. 6 is a diagram of one or more embodiments of an Attach procedure, according to the present disclosure.

Operation 6-1 is the same as Operations 2-1 to 2-11 of the Attach procedure of FIG. 2, described above.

Operation 6-2: Create Sessions Request. Operation 6-2 is the same as Operation 2-12 of the Attach procedure of FIG. 2, described above. A difference may be to send the message to a SGW-C.

The above two operations may be initial operations for any of the embodiments of an Attach procedure described below.

An embodiment of an Attach procedure wherein a control plane node allocates both a user plane IP address and a TEID may include the following:

Operation 6-3: Create Sessions Request. The SGW-C allocates the SGW-U IP address and the corresponding TEID for both the S1-U interface and S5/8-U interface to be used, then sends a Create Sessions Request message to SGW-U by including them.

Operation 6-4: Create Sessions Response. The SGW-U replies with a Create Sessions Response message.

Operation 6-5: Create Sessions Request. Operation 6-5 is the same as Operation 2-13 of the Attach procedure of FIG. 2.

Operation 6-6: Create Sessions Request. The PGW-C allocates the PGW-U IP address and the corresponding TEID for the S5/8-U interface to be used, then sends a Create Sessions Request message to the PGW-U by including them.

Operation 6-7: Create Sessions Response. The PGW-U replies with a Create Sessions Response message.

Operation 6-8: PCEF initiated IP-CAN Session Establishment/Modification. Operation 6-8 is the same as Operation 2-14 of the Attach procedure of FIG. 2.

Operation 6-9: Create Sessions Response. Operation 6-9 is the same as Operation 2-15 of the Attach procedure of FIG. 2.

Operation 6-10: Create Sessions Response. Operation 6-10 is the same as Operation 2-16 of the Attach procedure of FIG. 2.

Operation 6-11 is the same as Operations 2-17 to 2-26 of the Attach procedure of FIG. 2.

An embodiment relating to the Attach procedure wherein the control plane node allocates the user plane IP address that may include the following procedures.

Operation 6-3: Create Sessions Request. The SGW-C allocates the SGW-U IP addresses for both the S1-U interface and S5/8-U interface to be used, then sends a Create Sessions Request message to the SGW-U by including them.

Operation 6-4: Create Sessions Response. The SGW-U allocates the corresponding TEID to be used for both the S1-U interface and S5/8-U interface, then replies with a Create Sessions Response message by including them.

Operation 6-5: Create Sessions Request. Operation 6-5 is same as Operation 2-13 of the Attach procedure of FIG. 2.

Operation 6-6: Create Sessions Request. The PGW-C allocates the PGW-U IP address for the S5/8-U interface to be used, then sends a Create Sessions Request message to PGW-U by including it.

Operation 6-7: Create Sessions Response. The PGW-U allocates the corresponding TEID to be used for the S5/8-U interface, then replies with a Create Sessions Response message by including it.

Operation 6-8: PCEF initiated IP-CAN Session Establishment/Modification. Operation 6-8 is the same as Operation 2-14 of the Attach procedure of FIG. 2.

Operation 6-9: Create Sessions Response. Operation 6-9 is the same as Operation 2-15 of the Attach procedure of FIG. 2.

Operation 6-10: Create Sessions Response. Operation 6-10 is the same as Operation 2-16 of the Attach procedure of FIG. 2.

Operation 6-11 is the same as Operations 2-17 to 2-26 of the Attach procedure of FIG. 2.

An embodiment relating to the Attach procedure wherein the control plane node allocates TEID may include the following operations.

Operation 6-3: Create Sessions Request. The SGW-C allocates the TEIDs for both the S1-U interface and S5/8-U interface to be used, then sends a Create Sessions Request message to the SGW-U by including them.

Operation 6-4: Create Sessions Response. The SGW-U allocates the corresponding IP addresses to be used for both the S1-U interface and S5/8-U interface, then replies with a Create Sessions Response message by including them.

Operation 6-5: Create Sessions Request. Operation 6-5 is the same as Operation 2-13 of the Attach procedure of FIG. 2.

Operation 6-6: Create Sessions Request. The PGW-C allocates the TEID for the S5/8-U interface to be used, then sends a Create Sessions Request message to SGW-U by including it.

Operation 6-7: Create Sessions Response. The PGW-U allocates the corresponding IP address to be used for the S5/8-U interface, then replies with a Create Sessions Response message by including the corresponding IP address.

Operation 6-8: PCEF initiated IP-CAN Session Establishment/Modification. Operation 6-8 is the same as Operation 2-14 of the Attach procedure of FIG. 2.

Operation 6-9: Create Sessions Response. Operation 6-9 is the same as Operation 2-15 of the Attach procedure of FIG. 2.

Operation 6-10: Create Sessions Response. Operation 6-10 is the same as Operation 2-16 of the Attach procedure of FIG. 2.

Operation 6-11 is the same as Operations 2-17 to 2-26 of the Attach procedure of FIG. 2.

An embodiment relating to the Attach procedure wherein the user plane node allocates both a user plane IP address and a TEID and may include the following operations.

Operation 6-3: Create Sessions Request. The SGW-C sends a Create Sessions Request message to SGW-U.

Operation 6-4: Create Sessions Response. The SGW-U allocates the IP addresses and corresponding TEIDs to be used for both the S1-U interface and the S5/8-U interface, then replies with a Create Sessions Response message by including them.

Operation 6-5: Create Sessions Request. Operation 6-5 is the same as Operation 2-13 of the Attach procedure of FIG. 2.

Operation 6-6: Create Sessions Request. The PGW-C sends a Create Sessions Request message to PGW-U.

Operation 6-7: Create Sessions Response. The PGW-U allocates the IP addresses and corresponding TEIDs to be used for both the S1-U interface and S5/8-U interface, then replies with a Create Sessions Response message by including them.

Operation 6-8: PCEF initiated IP-CAN Session Establishment/Modification. Operation 6-8 is the same as Operation 2-14 of the Attach procedure of FIG. 2.

Operation 6-9: Create Sessions Response. Operation 6-9 is the same as Operation 2-15 of the Attach procedure of FIG. 2.

Operation 6-10: Create Sessions Response. Operation 6-10 is the same as Operation 2-16 of the Attach procedure of FIG. 2.

Operation 6-11 is the same as Operations 2-17 to 2-26 of the Attach procedure of FIG. 2.

Figure 7:
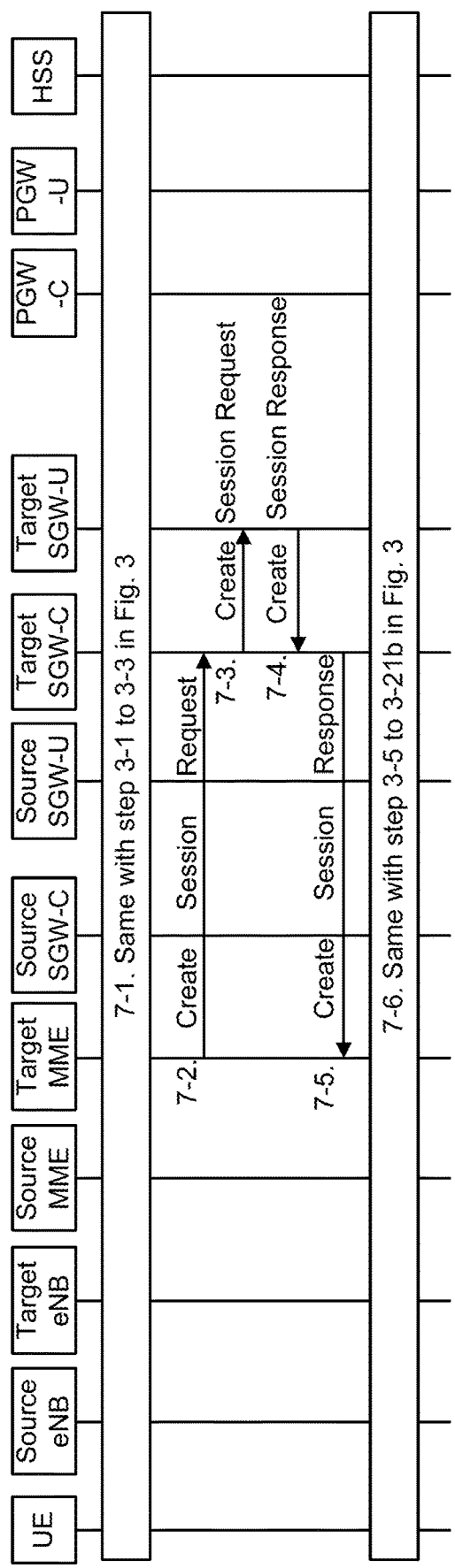
FIG. 7 is a diagram of a handover procedure, according to one embodiment of the present disclosure.

FIG. 7 is a diagram of one or more embodiments of a Handover procedure, according to the present disclosure.

Operation 7-1 is the same as Operations 3-1 to 3-3 of the Handover procedure of FIG. 3.

Operation 7-2: Create Session Request. Operation 7-2 is the same as Operation 3-4 of the Handover procedure of FIG. 3.

The above two operations may be initial operations for any of the embodiments of an S1-based Handover procedure described below.

An embodiment of an S1-based Handover procedure wherein control plane node allocates both a user plane IP address and a TEID may include the following procedures.

Operation 7-3: Create Session Request. The target SGW-C allocates the target SGW-U IP address and the corresponding TEID for both the S1-U interface and S5/8-U interface to be used, then sends the Create Session Request message to target SGW-U by including them.

Operation 7-4: Create Session Response. The SGW-U replies with a Create Session Response message.

Operation 7-5: Create Session Response. Operation 7-5 is the same as Operation 3-4a of the Handover procedure of FIG. 3.

Operation 7-6 is the same as Operations 3-5 to 3-21b of the Handover procedure of FIG. 3.

An embodiment of an S1-based Handover procedure wherein the control plane node allocates a user plane IP address may include the following procedures.

Operation 7-3: Create Session Request. The target SGW-C allocates the target SGW-U IP address(es) for both the S1-U interface and S5/8-U interface to be used, then sends the Create Session Request message to the target SGW-U by including the IP address.

Operation 7-4: Create Session Response. The target SGW-U allocates the target SGW-U TEIDs for both the S1-U interface and the S5/8-U interface to be used, then replies with a Create Session Response message by including them.

Operation 7-5: Create Session Response. Operation 7-5 is the same as Operation 3-4a of the Handover procedure of FIG. 3.

Operation 7-6 is the same as Operations 3-5 to 3-21b of the Handover procedure of FIG. 3.

An embodiment of an S1-based Handover procedure wherein the control plane node allocates a TEID may include the following procedures.

Operation 7-3: Create Session Request. The target SGW-C allocates the target SGW-U TEIDs for both the S1-U interface and the S5/8-U interface to be used, then sends the Create Session Request message to the target SGW-U by including it.

Operation 7-4: Create Session Response. The target SGW-U allocates the target SGW-U IP addresses for both the S1-U interface and S5/8-U interface to be used, then replies with a Create Session Response message by including them.

Operation 7-5: Create Session Response. Operation 7-5 is the same as Operation 3-4a of the Handover procedure of FIG. 3.

Operation 7-6 is the same as Operations 3-5 to 3-21*b* of the Handover procedure of FIG. 3.

An embodiment of an S1-based Handover procedure wherein a user plane node allocates both a user plane IP address and a TEID may include the following procedures.

Operation 7-3: Create Session Request. The target SGW-C sends the Create Session Request message to the target SGW-U.

Operation 7-4: Create Session Response. The target SGW-U allocates the target SGW-U IP addresses and corresponding TEIDs for both the S1-U interface and S5/8-U interface to be used, then replies with a Create Session Response message by including them.

Operation 7-5: Create Session Response. Operation 7-5 is the same as Operation 3-4*a* of the Handover procedure of FIG. 3.

Operation 7-6 is the same as Operations 3-5 to 3-21*b* of the Handover procedure of FIG. 3.

Figure 8:
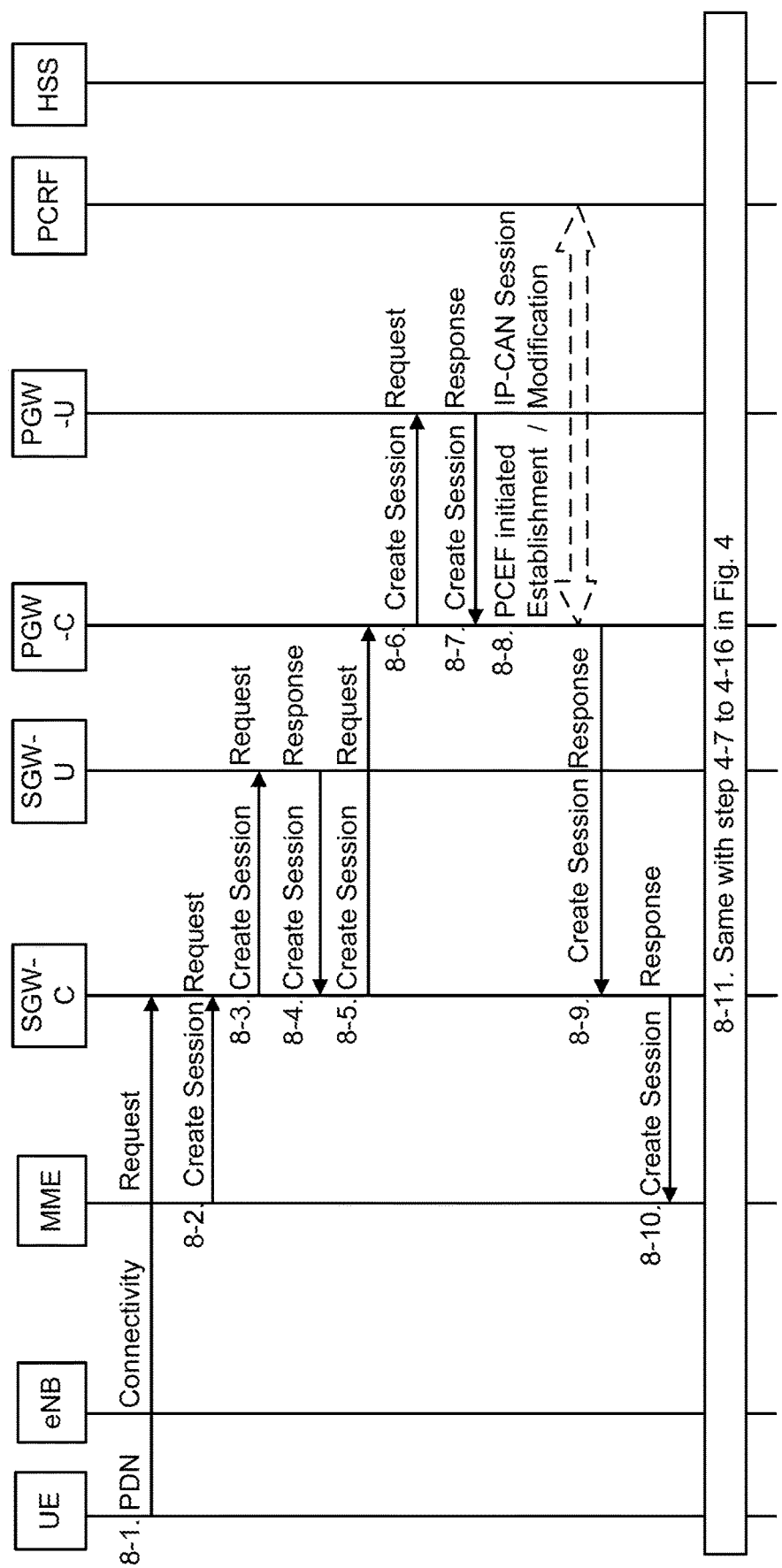
FIG. 8 is a diagram of a UE requested PDN connectivity procedure, according to one embodiment of the present disclosure.

FIG. 8 is a diagram of one or more embodiments of a UE requested PDN connectivity procedure, according to the present disclosure.

Operation 8-1: PDN Connectivity Request. Operation 8-1 is the same as Operation 4-1 of the UE requested PDN connectivity procedure of FIG. 4.

Operation 8-2: Create Session Request. Operation 8-2 is the same as Operation 4-2 of the UE requested PDN connectivity procedure of FIG. 4.

The above two operations may be initial operations for any of the embodiments of a UE requested PDN connectivity procedure described below.

An embodiment of a UE requested PDN connectivity procedure wherein a control plane node allocates both a user plane IP address and TEID may include the following procedures.

Operation 8-3: Create Session Request. The SGW-C allocates the SGW-U IP address and the corresponding TEID for both the S1-U interface and S5/8-U interface to be used. In the Create Session Request message, a SGW-U IP address and the corresponding TEID for both the S1-U interface and S5/8-U interface to be used are included.

Operation 8-4: Create Session Response. SGW-U replies with a Create Session Response message.

Operation 8-5: Create Session Request. Operation 8-5 is the same as Operation 4-13 of the UE requested PDN connectivity procedure of FIG. 4.

Operation 8-6: Create Session Request. The PGW-C allocates the PGW-U IP address and the corresponding TEID for S5/8-U interface to be used. In the Create Session Request message, a PGW-U IP address and the corresponding TEID for the S5/8-U interface to be used are included.

Operation 8-7: Create Session Response. PGW-U replies with a Create Session Response message.

Operation 8-8: PCEF initiated IP-CAN Session Establishment/Modification. Operation 8-8 is the same as Operation 4-4 of the UE requested PDN connectivity procedure of FIG. 4.

Operation 8-9: Create Session Response. Operation 8-9 is the same as Operation 4-5 of the UE requested PDN connectivity procedure of FIG. 4.

Operation 8-10: Create Session Response. Operation 8-10 is the same as Operation 4-6 of the UE requested PDN connectivity procedure of FIG. 4.

Operation 8-11. These procedures are same as procedures from Operation 4-7 to 4-16 of the UE requested PDN connectivity procedure of FIG. 4.

An embodiment relating to the UE requested PDN connectivity procedure wherein the control plane node allocates a user plane IP address may include the following procedures.

Operation 8-3: Create Session Request. The SGW-C allocates the SGW-U IP addresses for both the S1-U interface and S5/8-U interface to be used. In the Create Session Request message, the SGW-U IP address for both the S1-U interface and S5/8-U interface to be used are included.

Operation 8-4: Create Session Response. The SGW-U allocates the corresponding TEID to be used for both the S1-U interface and S5/8-U interface, then replies with a Create Session Response message by including them.

Operation 8-5: Create Session Request. Operation 8-5 is the same as Operation 4-13 of the UE requested PDN connectivity procedure of FIG. 4.

Operation 8-6: Create Session Request. The PGW-C allocates the PGW-U IP address for the S5/8-U interface to be used. In the Create Session Request message, the PGW-U IP address for the S5/8-U interface to be used is included.

Operation 8-7: Create Session Response. The PGW-U allocates the corresponding TEID to be used for the S5/8-U interface, then replies with a Create Session Response message by including it.

Operation 8-8: PCEF initiated IP-CAN Session Establishment/Modification. Operation 8-8 is the same as Operation 4-4 of the UE requested PDN connectivity procedure of FIG. 4.

Operation 8-9: Create Session Response. Operation 8-9 is the same as Operation 4-5 of the UE requested PDN connectivity procedure of FIG. 4.

Operation 8-10 is the same as Operation 4-6 of the UE requested PDN connectivity procedure of FIG. 4.

Operation 8-11 is the same as Operations 4-7 to 4-16 of the UE requested PDN connectivity procedure of FIG. 4.

An embodiment of a UE requested PDN connectivity procedure wherein the control plane node allocates TEID may include the following procedures.

Operation 8-3: Create Session Request. The SGW-C allocates the TEIDs for both the S1-U interface and S5/8-U interface to be used. In the Create Session Request message, TEIDs for both the S1-U interface and S5/8-U interface to be used are included.

Operation 8-4: Create Session Response. The SGW-U allocates the corresponding IP addresses to be used for both the S1-U interface and S5/8-U interface, then replies with a Create Session Response message by including them.

Operation 8-5: Create Session Request. Operation 8-5 is the same as Operation 4-13 of the UE requested PDN connectivity procedure of FIG. 4.

Operation 8-6: Create Session Request. The PGW-C allocates the TEID for the S5/8-U interface to be used. In the Create Session Request message, the PGW-U TEID for the S5/8-U interface to be used is included.

Operation 8-7: Create Session Response. The PGW-U allocates the corresponding IP address to be used for the S5/8-U interface, then replies with a Create Session Response message by including it.

Operation 8-8: PCEF initiated IP-CAN Session Establishment/Modification. Operation 8-8 is the same as Operation 4-4 of the UE requested PDN connectivity procedure of FIG. 4.

Operation 8-9: Create Session Response. Operation 8-9 is the same as Operation 4-5 of the UE requested PDN connectivity procedure of FIG. 4.

Operation 8-10 is the same as Operation 4-6 of the UE requested PDN connectivity procedure of FIG. 4.

Operation 8-11 is the same as Operations 4-7 to 4-16 of the UE requested PDN connectivity procedure of FIG. 4.

An embodiment of a UE requested PDN connectivity procedure wherein a user plane node allocates both a user plane IP address and a TEID may include the following procedures.

Operation 8-3: Create Session Request. The SGW-C sends a Create Session Request message to SGW-U.

Operation 8-4: Create Session Response. The SGW-U allocates the IP addresses and corresponding TEIDs to be used for both the S1-U interface and S5/8-U interface, then replies with a Create Session Response message by including them.

Operation 8-5: Create Session Request. Operation 8-5 is the same as Operation 4-13 of the UE requested PDN connectivity procedure of FIG. 4.

Operation 8-6: Create Session Request. The PGW-C sends a Create Session Request message to PGW-U.

Operation 8-7: Create Session Response. The PGW-U allocates the IP addresses and corresponding TEIDs to be used for both the S1-U interface and S5/8-U interface, then replies with a Create Session Response message by including them.

Operation 8-8: PCEF initiated IP-CAN Session Establishment/Modification. Operation 8-8 is the same as Operation 4-4 of the UE requested PDN connectivity procedure of FIG. 4.

Operation 8-9: Create Session Response. Operation 8-9 is the same as Operation 4-5 of the UE requested PDN connectivity procedure of FIG. 4.

Operation 8-10 is the same as Operation 4-6 of the UE requested PDN connectivity procedure of FIG. 4.

Operation 8-11 is the same as the procedures from Operations 4-7 to 4-16 of the UE requested PDN connectivity procedure of FIG. 4.

Figure 9:
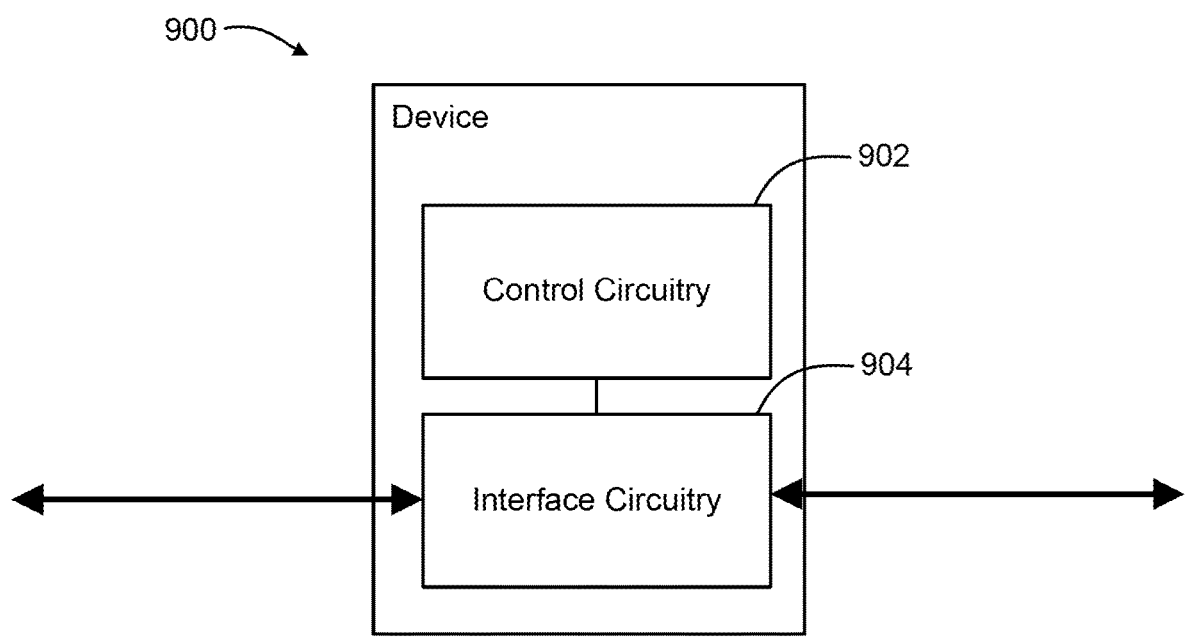
FIG. 9 is a block diagram of a device 900, including a node of a core network, in accordance with some embodiments.

FIG. 9 is a block diagram of a device 900, including a node of a core network, in accordance with some embodiments. The device 900 may include control circuitry 902 and interface circuitry 904. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The interface circuitry 904 may be communication circuitry configured to communicate with other network entities over various interfaces using appropriate networking communication protocols. The interface circuitry 904 may be capable of communicating over any number of wired or wireless communication interfaces. In some embodiments, the interface circuitry 904 may communicate over Ethernet or other computer networking technologies using a variety of physical media interfaces such as, but not limited to, coaxial, twisted-pair compare, and fiber-optics media interfaces.

The control circuitry 902 may be configured to provide higher-layer operations that include generating and processing signals transmitted and received by the interface circuitry 904. The control circuitry 902 may be control plane circuitry or user plane circuitry. The signals generated and/or processed by the control circuitry may be in accordance with one or more of FIGS. 2-4 and 6-8. The control circuitry 902 may be electronically coupled to the interface circuitry 904.

In some embodiments, the device of FIG. 9 may be a UE, an MME, a SGW, a PGW, a PCRF, a P-CSCF, or an S-CSF as described herein with respect to various embodiments. The control circuitry 902 may be configured to generate or otherwise allocate a resource (e.g., an IP address or TEID) as described herein.

Embodiments described herein may be implemented into a system using any suitably configured hardware and/or software.

Figure 10:
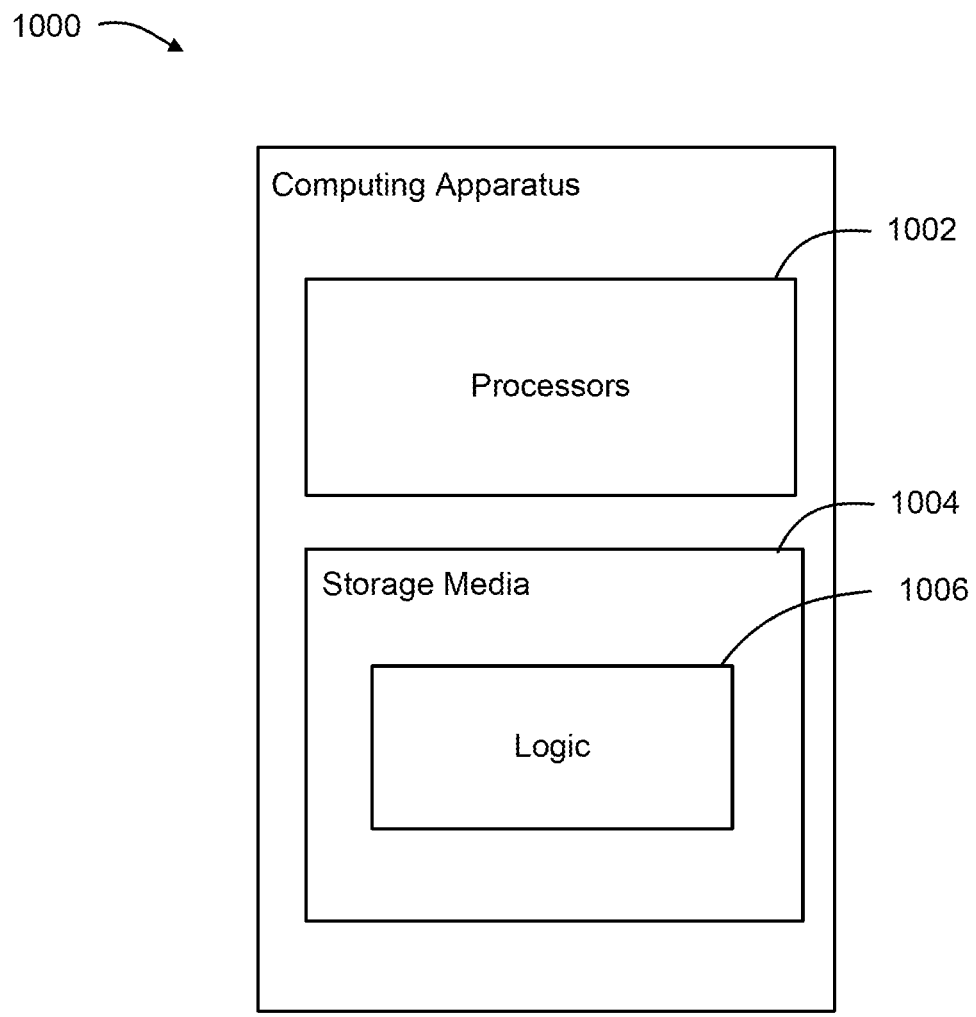
FIG. 10 is a computing apparatus, according to one embodiment of the present disclosure.

FIG. 10 illustrates, for one embodiment, example components of a computing apparatus 1000, which may comprise, or be part of, a UE, an MME, a SGW, a PGW, a PCRF, a P-CSCF, or an S-CSF.

The computing apparatus 1000 may include one or more processors 1002 coupled with one or more storage media 1004. The processors 1002 may include one or more single-core or multi-core processors 1002.

The processors 1002 may include any combination of general-purpose processors and dedicated processors including, for example, digital signal processors (DSPs), central processing units (CPUs), microprocessors, memory controllers (integrated or discrete), etc.

The storage media 1004 may be used to load and store data or instructions (collectively "logic" 1006) for operations performed by the processors. The storage media may include any combination of suitable volatile memory and non-volatile memory. The storage media may include any combination of various levels of memory/storage including, but not limited to, read-only memory (ROM) having embedded software instructions (e.g., firmware), random access memory (e.g., dynamic random access memory (DRAM)), cache, buffers, etc. The storage media 1004 may be shared among the various processors 1002 or dedicated to particular processors.

In some embodiments, one or more of the processors 1002 may be combined with one or more storage media 1004 and possibly other circuitry in a single chip, a single chipset, or disposed on a same circuit board in some embodiments.

The computing apparatus 1000 may perform one or more of the operations described above with respect to the control circuitry 902 or with respect to the interface circuitry 904.

In some embodiments, the electronic devices of FIG. 9 and/or FIG. 10 may be configured to perform one or more processes, techniques, and/or methods as described herein, or portions thereof, including in accordance with one or more of FIGS. 2-4 and 6-8.

Figure 11:
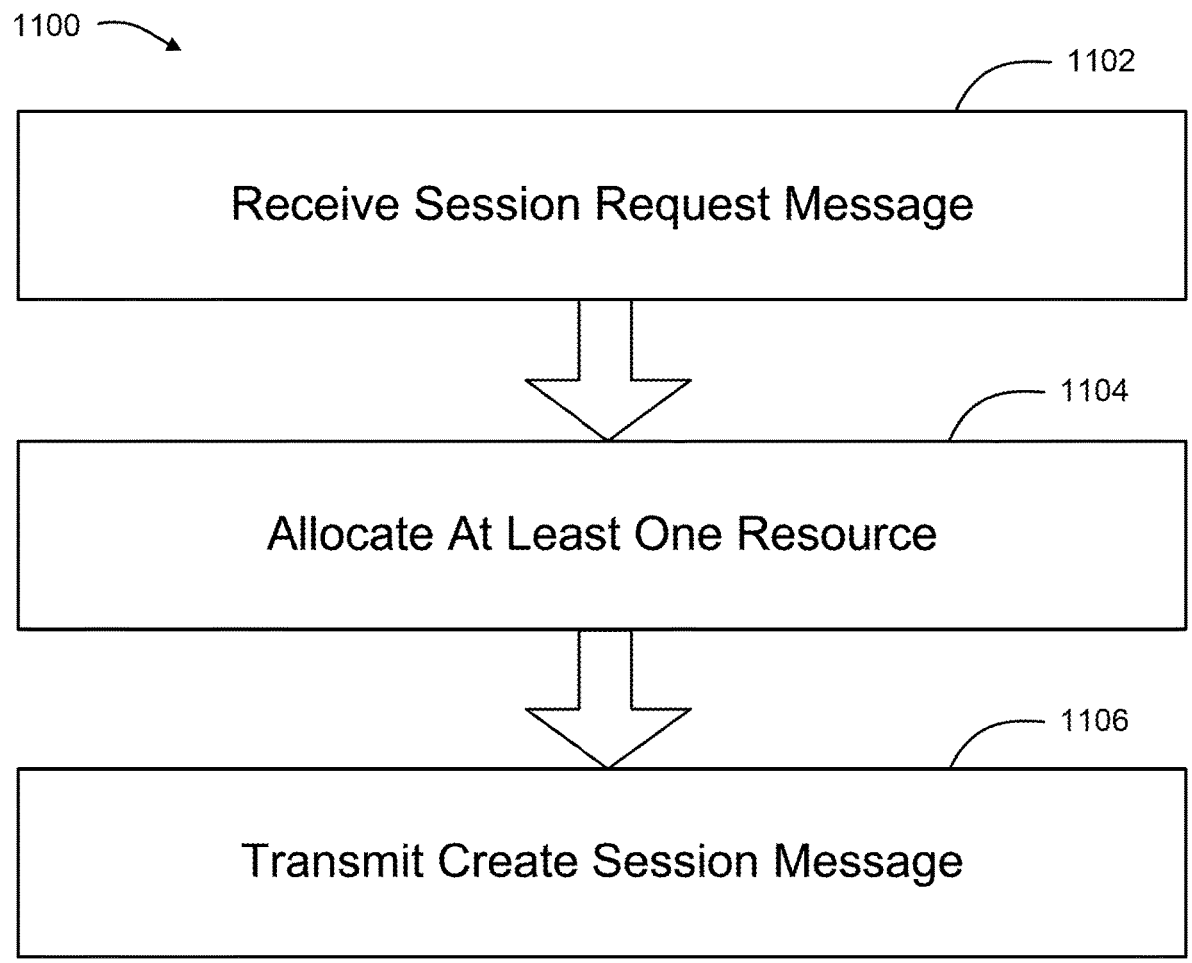
FIG. 11 is a flow diagram of a process of allocating a resource in a core network providing wireless communication services, according to one embodiment.

FIG. 11 is a flow diagram process 1100 of allocating a resources in a core network providing wireless communication services, according to one embodiment. For example, the process 1100 may include receiving 1102, or causing to receive, a session request message. The process may further include allocating 1104, or causing to allocate, at least one resource for at least one interface and transmitting 1106, or causing to transmit, a Create Session message that indicates the at least one resource to a user plane.

In some embodiments, the electronic devices of FIG. 9 and/or FIG. 10 may be configured to perform one or more processes, techniques, and/or methods as described herein, or portions thereof.

Figure 12:
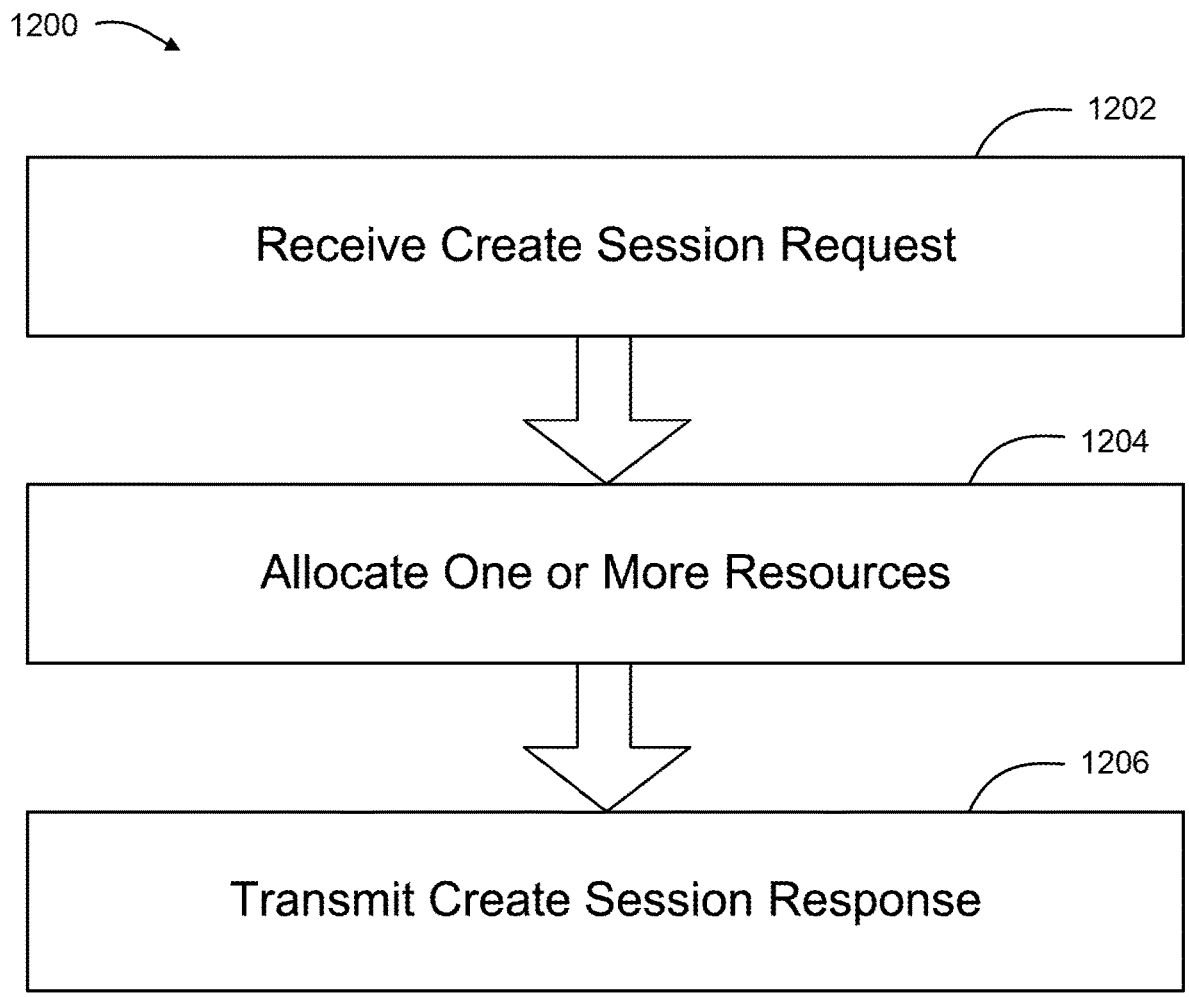
FIG. 12 is a flow diagram process of allocating a resource in a core network providing wireless communication services, according to another embodiment.

FIG. 12 is a flow diagram process 1200 of allocating a resource in a core network providing wireless communication services, according to another embodiment. For example, the process 1200 may include receiving 1202, or causing to receive, a Create Session request from a control plane. The process may further include allocating 1204, or causing to allocate, one or more resources for one or more interfaces in response to the reception of the Create Session request and transmitting 1206, or causing to transmit, a Create Session response to the control plane.

EXAMPLES

The following examples pertain to further embodiments.

Example 1

A node of a core network of a wireless communication system, comprising: communication circuitry to establish a communication link between the node and other nodes of the network; and control plane circuitry to implement control plane functions of a gateway of a wireless communication system, the control plane circuitry to allocate an internet protocol (IP) address for a user plane node and to communicate the IP address to the user plane node via the communication link established by the communication circuitry.

Example 2

The node of Example 1, wherein the node comprises a serving gateway (SGW) control plane (SGW-C) node and the user plane node comprises a SGW user plane (SGW-U) node that is to perform user plane functions of a SGW, wherein the communication circuitry is to establish a communication link with the SGW-U node, and wherein the SGW-U node is different from the SGW-C node.

Example 3

The node of Example 2, wherein communication between a mobility management entity of the wireless communication system and the SGW-U node is to be via the SGW-C node.

Example 4

The node of Example 2, further comprising second communication circuitry to establish a communication link between the node and a packet data network gateway (PGW) control plane node (PGW-C).

Example 5

The node of any of Examples 1-4, wherein the control plane circuitry is further configured to generate a tunnel endpoint identifier (TEID) for the user plane node and to provide the TEID to the user plane node.

Example 6

The node of any of Example 1-5, wherein the control plane circuitry is further to: receive a tunnel endpoint identifier (TEID) generated by a different node of the core network for the user plane node; and provide the TEID to the user plane node.

Example 7

The node of any of Examples 1-6, wherein the control plane circuitry allocates and communicates the IP address for the user plane node as part of an attach procedure for a user equipment (UE) to attach to the wireless communication system.

Example 8

The node of any of Examples 1-7, wherein the control plane circuitry allocates and communicates the IP address for the user plane node as part of a handover procedure for a user equipment (UE) to be handed over from a source node of the wireless communication system to a target node of the wireless communication system.

Example 9

The node of any of Examples 1-8, wherein the control plane circuitry allocates and communicates the IP address for the user plane node as part of a handover procedure for a user equipment (UE) to be handed over from a source node of the wireless communication system to a target node of the wireless communication system.

Example 10

The node of any of Examples 1-9, wherein the control plane circuitry allocates and communicates the IP address for the user plane node as part of a user equipment (UE) requested packet data network (PDN) connectivity procedure.

Example 11

The node of any of Examples 1-10, wherein the node comprises a packet data network gateway (PGW) control plane (PGW-C) node and the user plane node comprises a PGW user plane (PGW-U) node that is to perform user plane functions of a PGW, wherein the communication circuitry is to establish a communication link with the PGW-U node, and wherein the PGW-U node is different from the PGW-C node.

Example 12

The node of Example 11, wherein communication between a serving gateway (SGW) control plane (SGW-C) node of the wireless communication system and the PGW-U node is to be via the PGW-C node.

Example 13

The node of Example 12, further comprising second communication circuitry to establish a communication link between the node and the SGW-C.

Example 14

The node of any of Examples 1-13, wherein the node is a network controller computing system.

Example 15

The node of Example 14, wherein the network controller computing system is an evolved packet core controller.

Example 16

The node of any of Examples 1-15, wherein the control plane circuitry is further to receive a tunnel endpoint identifier (TEID) of the user plane node.

Example 17

The node of any of Examples 1-16, wherein the control plane circuitry is further to receive a create session request.

Example 18

A computer-readable storage medium having stored thereon instructions that, when executed by one or more computing devices, cause the one or more computing devices to perform operations to: allocate an internet protocol (IP) address for a user plane node; and prepare a create session message, including the IP address, for transmission to the user plane node.

Example 19

The computer-readable storage medium of Example 18, further comprising instructions that, when executed by one or more computing devices, cause the one or more computing devices to perform operations to: allocate a tunnel endpoint identifier (TEID) for the user plane node; and prepare the create session message including the TEID.

Example 20

The computer-readable storage medium of any of Examples 18-19, further comprising instructions that, when executed by one or more computing devices, cause the one or more computing devices to perform operations to: receive a tunnel endpoint identifier (TEID) for the user plane node.

Example 21

A node of a core network of a wireless communication system, comprising: communication circuitry to establish a communication link between the node and other nodes of the network; and control plane circuitry to implement control plane functions of a gateway of a wireless communication system, the control plane circuitry to generate a tunnel endpoint identifier (TEID) for a user plane node and to provide the TEID to the user plane node via the communication link established by the communication circuitry.

Example 22

The node of Example 21, wherein the node comprises a serving gateway (SGW) control plane (SGW-C) node and the user plane node comprises a SGW user plane (SGW-U) node that is to perform user plane functions of a SGW, wherein the communication circuitry is to establish a communication link with the SGW-U node, and wherein the SGW-U node is different from the SGW-C node.

Example 23

The node of any of Examples 21-22, wherein the control plane circuitry is further to: receive an IP address generated by the user plane node for the user plane node.

Example 24

The node of any of Examples 21-23, wherein the control plane circuitry generates and communicates the TEID for the user plane node as part of an attach procedure for a user equipment (UE) to attach to the wireless communication system.

Example 25

The node of any of Examples 21-24, wherein the control plane circuitry generates and communicates the TEID for the user plane node as part of a handover procedure for a user equipment (UE) to be handed over from a source node of the wireless communication system to a target node of the wireless communication system.

Example 26

The node of any of Examples 21-25, wherein the control plane circuitry generates and communicates the TEID for the user plane node as part of a user equipment (UE) requested packet data network (PDN) connectivity procedure.

Example 27

The node of any of Examples 21-26, wherein the node comprises a packet data network gateway (PGW) control plane (PGW-C) node and the user plane node comprises a PGW user plane (PGW-U) node that is to perform user plane functions of a PGW, wherein the communication circuitry is to establish a communication link with the PGW-U node, and wherein the PGW-U node is different from the PGW-C node.

Example 28

The node of Example 27, wherein communication between a serving gateway (SGW) control plane (SGW-C) node of the wireless communication system and the PGW-U node is to be via the PGW-C node.

Example 29

A computer-readable storage medium having stored thereon instructions that, when executed by one or more computing devices, cause the one or more computing devices to perform operations to: allocate a tunnel endpoint identifier (TEID) for a user plane node; and prepare a create session message, including the TEID, for transmission to the user plane node.

Example 30

The computer-readable storage medium of Example 29, further comprising instructions that, when executed by one or more computing devices, cause the one or more computing devices to perform operations to: receive an internet protocol (IP) address for the user plane node.

Example 31

A node of a core network of a wireless communication system, comprising: communication circuitry to establish a communication link between the node and other nodes of the network; and user plane circuitry to implement user plane functions of a gateway of a wireless communication system, the user plane circuitry to allocate an internet protocol (IP) address for the node and to communicate the IP address to a control plane node via the communication link established by the communication circuitry.

Example 32

The node of Example 31, wherein the node comprises a serving gateway (SGW) user plane (SGW-U) node and the control plane node comprises a SGW control plane (SGW-C) node that is to perform control plane functions of a SGW, wherein the communication circuitry is to establish a communication link with the SGW-C node, and wherein the SGW-C node is different from the SGW-U node.

Example 33

The node of Example 32, wherein communication between a mobility management entity of the wireless communication system and the SGW-U node is to be via the SGW-C node.

Example 34

The node of Example 32, further comprising second communication circuitry to establish a communication link between the node and a packet data network gateway (PGW) user plane node (PGW-U).

Example 35

The node of any of Examples 31-34, wherein the user plane circuitry is further configured to generate a tunnel endpoint identifier (TEID) and to provide the TEID to the control plane node.

Example 36

The node of any of Examples 31-35, wherein the node comprises a packet data network gateway (PGW) user plane (PGW-U) node and the control plane node comprises a PGW control plane node (PGW-C) that is to perform control plane functions of a PGW, wherein the communication circuitry is to establish a communication link with the PGW-C node, and wherein the PGW-C node is different from the PGW-U node.

Example 37

The node of Example 36, wherein communication between a serving gateway (SGW) control plane (SGW-C) node of the wireless communication system and the PGW-U node is to be via the PGW-C node.

Example 38

The node of Example 36, further comprising second communication circuitry to establish a communication link between the node and the SGW-U.

Example 39

A computer-readable storage medium having stored thereon instructions that, when executed by one or more computing devices, cause the one or more computing devices to perform operations to: allocate an internet protocol (IP) address for a user plane node; and prepare a message, including the IP address, for transmission to a control plane node.

Example 40

The computer-readable storage medium of Example 39, further comprising instructions that, when executed by one or more computing devices, cause the one or more computing devices to perform operations to: allocate a tunnel endpoint identifier (TEID) for a user plane node; and prepare the message, including the TEID, for transmission to the control plane node.

Example 41

A node of a core network of a wireless communication system, comprising: communication circuitry to establish a communication link between the node and other nodes of the network; and user plane circuitry to implement user plane functions of a gateway of a wireless communication system, the user plane circuitry to generate a tunnel endpoint identifier (TEID) for the node and to provide the TEID to the control plane node via the communication link established by the communication circuitry.

Example 42

The node of Example 41, wherein the node comprises a serving gateway (SGW) user plane (SGW-U) node and the control plane node comprises a SGW control plane (SGW-C) node that is to perform control plane functions of a SGW, wherein the communication circuitry is to establish a communication link with the SGW-C node, and wherein the SGW-C node is different from the SGW-U node.

Example 43

The node of any of Examples 41-42, wherein the node comprises a packet data network gateway (PGW) user plane (PGW-U) node and the control plane node comprises a PGW control plane node (PGW-C) that is to perform control plane functions of a PGW, wherein the communication circuitry is to establish a communication link with the PGW-C node, and wherein the PGW-C node is different from the PGW-U node.

Example 44

A computer-readable storage medium having stored thereon instructions that, when executed by one or more computing devices, cause the one or more computing devices to perform operations to: allocate a tunnel endpoint identifier (TEID) for a user plane node; and prepare a message, including the TEID, for transmission to a control plane node.

Example 45

An apparatus for a node of a core network of a wireless communication system, comprising: interface circuitry to establish a communication link with another node of the network; and control circuitry to implement control plane functions of a gateway of a wireless communication system, the control plane circuitry to allocate an internet protocol (IP) address for a user plane node and to communicate the IP address to the user plane node via the communication link established by the communication circuitry.

Example 46

An apparatus for a node of a core network of a wireless communication system, comprising: interface circuitry to establish a communication link with another node of the network; and control circuitry to implement control plane functions of a gateway of a wireless communication system, the control plane circuitry to generate a tunnel endpoint identifier (TEID) for a user plane node and to provide the TEID to the user plane node via the communication link established by the communication circuitry.

Example 47

An apparatus for a node of a core network of a wireless communication system, comprising: interface circuitry to establish a communication link with another node of the network; and control circuitry to implement user plane functions of a gateway of a wireless communication system, the user plane circuitry to allocate an internet protocol (IP) address for the node and to communicate the IP address to a control plane node via the communication link established by the communication circuitry.

Example 48

An apparatus for a node of a core network of a wireless communication system, comprising: interface circuitry to establish a communication link with another node of the network; and control circuitry to implement user plane functions of a gateway of a wireless communication system, the user plane circuitry to generate a tunnel endpoint identifier (TEID) for the node and to provide the TEID to the control plane node via the communication link established by the communication circuitry.

Example 49

An device of a node of a core network of a wireless communication system, comprising: means for communicating to establish a communication link between the node and other nodes of the network; and means for control processing to implement control plane functions of a gateway of a wireless communication system, the control processing means to allocate an internet protocol (IP) address for a user plane node and to communicate the IP address to the user plane node via the communication link established by the communicating means. Examples of communicating means may be communication circuitry, a network interface card (NIC), or other suitable technology for establishing an electronic connection based on a communication protocol. Examples of control processing means may be control circuitry, a processor or processing device, a computing device, or other technology for processing instructions and/or data.

Example 49

An device of a node of a core network of a wireless communication system, comprising: means for communicating to establish a communication link between the node and other nodes of the network; and means for control processing to implement control plane functions of a gateway of a wireless communication system, the control processing means to allocate an internet protocol (IP) address for a user plane node and to communicate the IP address to the user plane node via the communication link established by the communicating means.

Example 50

The device of Example 49, wherein the node comprises a serving gateway (SGW) control plane (SGW-C) node and the user plane node comprises a SGW user plane (SGW-U) node that is to perform user plane functions of a SGW, wherein the communicating means is to establish a communication link with the SGW-U node, and wherein the SGW-U node is different from the SGW-C node.

Example 51

The node of any of Examples 49-50, wherein communication between a mobility management entity of the wireless communication system and the SGW-U node is to be via the SGW-C node.

Example 52

The node of any of Examples 49-51, further comprising second means for communicating to establish a communication link between the node and a packet data network gateway (PGW) control plane node (PGW-C).

Example 53

The node of any of Examples 49-52, wherein the control processing means is further configured to generate a tunnel endpoint identifier (TEID) for the user plane node and to provide the TEID to the user plane node via the communication link established by the communicating means.

Various techniques, or certain aspects or portions thereof, may take the form of program code (i.e., instructions) embodied in tangible media, such as floppy diskettes, CD-ROMs, hard drives, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

It will be understood by those having skill in the art that many changes may be made to the details of the above-described embodiments without departing from the underlying principles of the present disclosure. The scope of the present invention should, therefore, be determined only by the following claims.

The invention claimed is:

1. A node of a core network of a wireless communication system, comprising:

communication circuitry to establish a communication link between the node and other nodes of the network; and control plane circuitry to:
implement control plane functions of a gateway of a wireless communication system;
allocate an internet protocol (IP) address for a user plane node;
communicate the IP address to the user plane node via the communication link established by the communication circuitry;
receive a tunnel endpoint identifier (TEID) generated by a different node of the core network for the user plane node; and
provide the TEID to the user plane node;

wherein the control plane circuitry of the node is different from the user plane node.

2. The node of claim 1, wherein the node comprises a serving gateway (SGW) control plane (SGW-C) node and the user plane node comprises a SGW user plane (SGW-U) node that is to perform user plane functions of a SGW, wherein the communication circuitry is to establish a communication link with the SGW-U node, and wherein the SGW-U node is different from the SGW-C node.

3. The node of claim 2, wherein communication between a mobility management entity of the wireless communication system and the SGW-U node is to be via the SGW-C node.

4. The node of claim 2, further comprising second communication circuitry to establish a communication link between the node and a packet data network gateway (PGW) control plane node (PGW-C).

5. The node of claim 1, wherein the control plane circuitry is further configured to generate a tunnel endpoint identifier (TEID) for the user plane node and to provide the TEID to the user plane node.

6. The node of claim 1, wherein the control plane circuitry allocates and communicates the IP address for the user plane node as part of an attach procedure for a user equipment (UE) to attach to the wireless communication system.

7. The node of claim 1, wherein the control plane circuitry allocates and communicates the IP address for the user plane node as part of a handover procedure for a user equipment (UE) to be handed over from a source node of the wireless communication system to a target node of the wireless communication system.

8. The node of claim 1, wherein the control plane circuitry allocates and communicates the IP address for the user plane node as part of a handover procedure for a user equipment (UE) to be handed over from a source node of the wireless communication system to a target node of the wireless communication system.

9. The node of claim 1, wherein the control plane circuitry allocates and communicates the IP address for the user plane node as part of a user equipment (UE) requested packet data network (PDN) connectivity procedure.

10. The node of claim 1, wherein the node comprises a packet data network gateway (PGW) control plane (PGW-C) node and the user plane node comprises a PGW user plane (PGW-U) node that is to perform user plane functions of a PGW, wherein the communication circuitry is to establish a communication link with the PGW-U node, and wherein the PGW-U node is different from the PGW-C node.

11. The node of claim 10, wherein communication between a serving gateway (SGW) control plane (SGW-C) node of the wireless communication system and the PGW-U node is to be via the PGW-C node.

12. The node of claim 11, further comprising second communication circuitry to establish a communication link between the node and the SGW-C.

13. The node of claim 1, wherein the node is a network controller computing system.

14. The node of claim 13, wherein the network controller computing system is an evolved packet core controller.

15. The node of claim 1, wherein the control plane circuitry is further to receive a tunnel endpoint identifier (TEID) of the user plane node.

16. The node of claim 1, wherein the control plane circuitry is further to receive a create session request.

17. A non-transitory computer-readable storage medium having stored thereon instructions that, when executed by one or more computing devices, cause the one or more computing devices to perform operations to:
   implement control plane functions of a gateway of a wireless communication system;
   allocate an internet protocol (IP) address for a user plane node configured to implement user plane functions of the gateway, the one or more computing devices to implement the control functions being separate from the user plane node to implement the user plane functions; and
   prepare a create session message, including the IP address, for transmission to the user plane node.

18. The non-transitory computer-readable storage medium of claim 17, further comprising instructions that, when executed by one or more computing devices, cause the one or more computing devices to perform operations to:
   allocate a tunnel endpoint identifier (TEID) for the user plane node; and
   prepare the create session message including the TEID.

19. The non-transitory computer-readable storage medium of claim 17, further comprising instructions that, when executed by one or more computing devices, cause the one or more computing devices to perform operations to:
   receive a tunnel endpoint identifier (TEID) for the user plane node.

* * * * *